US006098756A

United States Patent [19]

Shigetomi et al.

[11] Patent Number: 6,098,756

[45] Date of Patent: Aug. 8, 2000

[54] GUIDE RAIL LUBRICATING DEVICE FOR ELEVATOR, AND CASE AND OIL-RETAINING MEMBER FOR THE LUBRICATING DEVICE

[75] Inventors: Nobumichi Shigetomi, Tokyo; Masaki Nakano, Chiba; Tomoharu Onishi; Tokiji Tamaru, both of Ibaraki; Shigeyuki Sato, Chiba; Atsushi Hotta, Tokyo, all of Japan

[73] Assignees: Hitachi Building Systems Co., Ltd.; Nanshin Kiko Co., Ltd., both of Tokyo, Japan

[21] Appl. No.: 09/270,015

[22] Filed: Mar. 16, 1999

[30] Foreign Application Priority Data

| | | | |
|---|---|---|---|
| Jun. 25, 1998 | [JP] | Japan | 10-178878 |
| Jul. 7, 1998 | [JP] | Japan | 10-191959 |
| Feb. 26, 1999 | [JP] | Japan | 11-051563 |

[51] Int. Cl.[7] ........ F16N 7/12

[52] U.S. Cl. ........ 184/22; 184/21

[58] Field of Search ........ 184/21, 22, 102

[56] References Cited

U.S. PATENT DOCUMENTS

| | | | |
|---|---|---|---|
| 787,978 | 4/1905 | Eggler | 184/22 |
| 1,007,422 | 10/1911 | Berger | 184/21 |
| 1,045,977 | 12/1912 | Hirz | 184/22 |
| 1,102,641 | 7/1914 | Berger | 184/22 |
| 1,109,125 | 9/1914 | Heisler et al. | 184/22 |
| 1,274,942 | 8/1918 | Schenck | 184/22 |
| 1,290,618 | 1/1919 | MacIndoe | 184/22 |
| 1,643,038 | 9/1927 | Weigele | 184/22 |
| 1,805,305 | 5/1931 | Brady | 184/22 |
| 1,897,764 | 2/1933 | Norton | 184/22 |

FOREIGN PATENT DOCUMENTS

| | | | |
|---|---|---|---|
| 53866 | 1/1929 | German Dem. Rep. | 184/22 |
| 303299 | 1/1929 | United Kingdom | 184/22 |

*Primary Examiner*—Mary Ann Battista
*Assistant Examiner*—Chong H. Kim
*Attorney, Agent, or Firm*—Evenson, McKeown, Edwards & Lenahan, P.L.L.C.

[57] ABSTRACT

In each of oil-retaining sheets, an end edge and side edges of a recess are separated from each other. The side edges are formed into tongue portions covered by first anti-wear meshes which prevent loosing of the side edges, and these tongue portions are maintained in sliding contact with their corresponding side walls of a guide portion of a guide rail. The end edge is covered by a second anti-wear mesh which prevents loosing of the end edge, and the second anti-wear mesh is maintained in sliding contact with an end wall of the guide portion. A gap is also formed to maintain the tongue portions and the second anti-wear mesh out of contact with each other.

25 Claims, 14 Drawing Sheets

GUIDE RAIL LUBRICATING DEVICE FOR ELEVATOR, AND CASE AND OIL-RETAINING MEMBER FOR THE LUBRICATING DEVICE

BACKGROUND OF THE INVENTION

1) Field of the Invention

This invention relates to a guide rail lubricating device for an elevator, and also to a case and oil-retaining member for the lubricating device.

2) Description of the Related Art

As is disclosed in JP 8-91735, the present applicant developed, as a guide rail lubricating device for an elevator, one constructed of a bottomed case for being mounted on an ascending/descending unit operably ascendable and descendable within a shaft, an oil-retaining member accommodated within the case, and a lid covering a top opening of the case. The case has a recess through which a guide portion of a guide rail can extend. The oil-retaining member is formed of plural oil-retaining sheets stacked on over the other. These oil-retaining sheets are made of kapok, have shape-retaining property, and are provided with recesses through which the guide portion can extend. The lid has a recess through which the guide portion can extend. Lubricating oil with which the oil-retaining sheets are impregnated can therefore be supplied from the recesses of the oil-retaining sheets to the guide portion.

With a view to preventing loosing of the oil-retaining sheets along the recesses thereof in the above-described guide rail lubricating device, each oil-retaining sheet was modified in such a way that both side edges of the recess in the oil-retaining sheet were formed into tongue portions covered by first wear-resistant meshes intended to prevent loosing of the side edges and an end edge of the recess in the oil-retaining sheet was covered by a second wear-resistant mesh intended to prevent loosing of the end edge. This modified construction has however been found to involve a problem in that the tongue portions are pushed by the second wear-resistant mesh and are caused to outwardly flare (in the form of a widened V letter without the connecting part of the two arms), whereby the tongue portions cannot be maintained in uniform sliding contact with both side walls of the guide portion.

SUMMARY OF THE INVENTION

A first object of the present invention is to provide a guide rail lubricating device for an elevator, which can solve the above-described problem by a simple construction.

A second object of the present invention is to provide a guide rail lubricating device for an elevator, which makes it possible to provide tongue portions, which are formed at both side edges of a recess in each oil-retaining sheet and covered by first wear-resistant meshes, and a second wear-resistant mesh, which is arranged on an end edge of the recess in the oil-retaining sheet and serves to prevent loosing, with extended service life.

A third object of the present invention is to provide a guide rail lubricating device for an elevator, which is free from oversupplying lubricating oil from a recess of an oil-retaining member to a guide portion of the guide rail.

A fourth object of the present invention is to provide a guide rail lubricating device for an elevator, which makes it possible to prevent arranging an oil-retaining member up-side down within a case.

A fifth object of the present invention is to provide a case for a guide rail lubricating device of an elevator, which is light in weight and is excellent in productivity.

A sixth object of the present invention is to provide an oil-retaining member for a guide rail lubricating device of an elevator, which has excellent handling and can be impregnated with lubricating oil in a short time.

The first object can be achieved by separating side edges and an end edge of a recess in each of oil-retaining sheets from each other; forming the side edges in tongue portions covered by first wear-resistant meshes, which serve to prevent loosing of the side edges, such that the tongue portions can be maintained in sliding contact with side walls of a guide portion; covering the end edge of the recess in the oil-retaining sheet by a second wear-resistant mesh, which serves to prevent loosing of the end edge, such that the second wear-resistant mesh can be maintained in sliding contact with an end wall of the guide portion; and forming gaps between the side edges and the end edge, respectively, such that the tongue portions and the second wear-resistant mesh can be maintained out of contact with each other.

According to the above construction, the tongue portions, which are covered by the first wear-resistant meshes, and the second wear-resistant mesh are apart from each other and are maintained out of contact with each other while the tongue portions and the second wear-resistant mesh are in sliding contact with the side walls of the guide portion and the end wall of the guide portion, respectively. This makes it possible to avoid such a situation that the second wear-resistant mesh would be brought into contact with the tongue portions and the tongue portions would hence be pushed outwards. The tongue portions can therefore be protected from outwardly flaring (in the form of a widened V letter without the connecting part of the two arms).

The second object can be achieved by separating side edges and an end edge of a recess in each of oil-retaining sheets from each other; forming the side edges in tongue portions covered by first wear-resistant meshes, which serve to prevent loosing of the side edges, such that the tongue portions can be maintained in sliding contact with side walls of a guide portion; covering the end edge of the recess in the oil-retaining sheet by a second wear-resistant mesh, which serves to prevent loosing of the end edge, such that the second wear-resistant mesh can be maintained in sliding contact with an end wall of the guide portion; and making the first wear-resistant meshes and the second wear-resistant mesh with nylon fibers having a 140-denier diameter and forming them in knitted structures of approximately 1 mm in thickness.

As the diameters of the first wear-resistant meshes and second wear-resistant mesh are extremely small, that is, 140 denier, the above construction can reduce scuff which is produced upon sliding contact of the tongue portions and second wear-resistant mesh of each oil-retaining sheet with the side walls and end wall of the guide portion. Moreover, the first wear-resistant meshes and second wear-resistant mesh are formed in knitted structures made of nylon fibers, so that the first wear-resistant meshes and second wear-resistant mesh are resistant to loosing although they are used in sliding contact with the side walls and end wall of the guide portion. This makes it possible to significantly extend the replacement cycle of the oil-retaining member and the oil replenishment cycle to the oil-retaining member.

The third object can be achieved by using, as plural oil-retaining sheets, contact oil-retaining sheets and non-contact oil-retaining sheets and stacking them one over the other into an oil-retaining member. In the contact oil-retaining sheets, recesses, through which the guide portion extends, are formed with dimensions set smaller than contour dimensions of the guide portion; side edges and an end edge of the recess in each of the contact oil-retaining sheets are separated from each other; the side edges are formed in tongue portions covered by first wear-resistant meshes, which serve to prevent loosing of the side edges, such that the tongue portions can be maintained in sliding contact with side walls of the guide portion; and the end edge of the recess is covered by a second wear-resistant mesh, which serves to prevent loosing of the end edge, such that the second wear-resistant mesh can be maintained in sliding contact with an end wall of the guide portion. In the non-contact oil-retaining sheets, recesses, through which the guide portion extends, are formed with dimensions set greater than contour dimensions of the guide portion such that side edges and an end edge of each of the recesses can be maintained out of contact with the guide portion. Each of the contact oil-retaining sheets has gaps formed between the tongue portions thereof and the second wear-resistant mesh associated therewith, respectively, such that the tongue portions and the second wear-resistant mesh can be maintained out of contact with each other.

According to the above construction, the tongue portions are protected from outwardly flaring (in the form of a widened V letter without the connecting part of the two arms). Further, owing to the alternate stacking of the non-contact oil-retaining sheets and the contact oil-retaining sheets, escape spaces are formed over and under the tongue portions. When each tongue portion is brought into sliding contact with the corresponding side wall of the guide portion, the tongue portion is protected from being brought into such a state that the tongue portion would be strongly squeezed between the side wall of the guide portion and its adjacent other tongue portion. Therefore, lubricating oil is not caused to flow too much toward the side walls of the guide portion.

The fourth object can be achieved by a construction in which: oiling holes are formed through all oil-retaining sheets other than one located in a bottom part within a case, respectively, such that an oilway is formed communicating from an upper side of one of the oil-retaining sheets, said one oil-retaining sheet being located in a top part within the case, to an upper side of the oil-retaining sheet located in the bottom part within the case; and the oil-retaining sheets are provided with inverted-setting preventing pin insertion bores, respectively, such that an inverted-setting preventing pin arranged within the case can be inserted into the inverted-setting preventing pin insertion bores only when the oil-retaining member is arranged within the case with the oil-retaining sheet, which is free of the oiling hole and is to be located in the bottom part within the case, being directed downward.

According to the above construction, any attempt to place the oil-retaining member within the case with the oil-retaining sheet free of the oiling hole being located at the top results in offsetting of the inverted-setting preventing pin insertion bores from the position of the inverted-setting preventing pin, so that the inverted-setting preventing pin cannot be inserted into the inverted-setting preventing pin insertion bores. As a consequence, the oil-retaining member cannot be arranged within the case.

The fifth object can be achieved by a construction in which: plural pins arranged on an inner bottom of the case to position an oil-retaining member; an inverted-setting preventing pin arranged on the inner bottom to prevent inverted setting of the oil-retaining member; a surrounding rib and at least one reinforcing rib, both of which are arranged on an outer bottom of the case; a horizontal flange arranged on and along an upper end of the case and defining at an inner peripheral edge a top opening of the case; a lid provided with a deformation preventing rib which can be maintained in contact with the inner peripheral edge of the horizontal flange; a hinge portion arranged on the horizontal flange and connecting the lid and the case together such that the lid can be opened or closed as desired; and a resilient lock element arranged on the horizontal flange for maintaining the lid in a closed position; wherein the pins, the inverted-setting preventing pin, the surrounding rib, the reinforcing rib, the horizontal flange, the lid, the hinge portion and the resilient lock element are integrally formed with a synthetic resin.

According to the above construction, the case as a container for the oil-retaining member can be formed together with the lid into a synthetic resin product by a single operation.

The sixth object can be achieved by a construction in which: the contact oil-retaining sheets and the non-contact oil-retaining sheets are alternately stacked one over the other such that one of the non-contact oil-retaining sheets is arranged in a top part within the case and one of the contact oil-retaining sheets is arranged in a bottom part within the case; all of the contact oil-retaining sheets and the non-contact oil-retaining sheets are fastened together by plural fastening members; the non-contact oil-retaining sheets and the contact oil-retaining sheets are provided with positioning through-holes, respectively, at locations adjacent the recesses through which the guide portion can extend, and the non-contact oil-retaining sheets and the contact oil-retaining sheets other than one located in a bottom part within the case, are all provided with oiling holes, respectively, such that oilways are formed communicating from an upper side of one of the non-contact oil-retaining sheets, said none non-contact oil-retaining sheet being located in a top part within the case, to an upper side of the contact oil-retaining sheet located in the bottom part within the case; and the non-contact oil-retaining sheets and the contact oil-retaining sheets are all provided with inverted-setting preventing pin insertion bores, respectively, such that an inverted-setting preventing pin arranged within the case can be inserted into the inverted-setting preventing pin insertion bores only when the tightened non-contact oil-retaining sheets and contact oil-retaining sheets are placed in a right direction in the case.

According to the above construction, the plural non-contact oil-retaining sheets and the plural contact oil-retaining sheets can be placed together in or out of the case. Further, a supply of lubricating oil into the oilways makes it possible to impregnate the plural non-contact oil-retaining sheets and the plural contact oil-retaining sheets thoroughly with the lubricating oil in a short time.

DETAILED DESCRIPTION OF THE INVENTION AND PREFERRED EMBODIMENTS

The one embodiment of the present invention will hereinafter be described based on FIG. 1 through FIG. 20.

Figure 1:
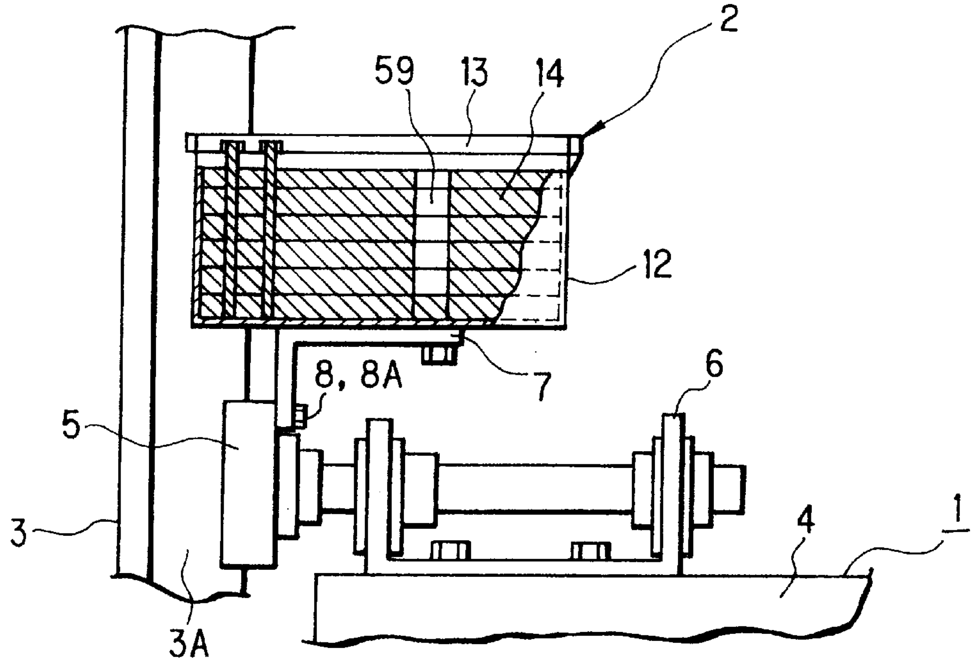
FIG. 1 shows one embodiment of the present invention, and is a simplified schematic view illustrating the mounted state of a guide rail lubricating device for an elevator.

In FIG. 1, a guide rail lubricating device 2 for an elevator 1 is arranged above a guide shoe support frame 5, which causes an ascending/descending unit 4 as a car or a balance weight to ascend or descend along a guide rail 3 disposed upright in a shaft. The guide shoe support frame 5 is mounted on a mount member 6 secured on a top part of the ascending/descending unit 4. On the guide shoe support frame 5, a bracket 7 made of an angle steel is fixed by bolts 8,8A.

Figure 2:
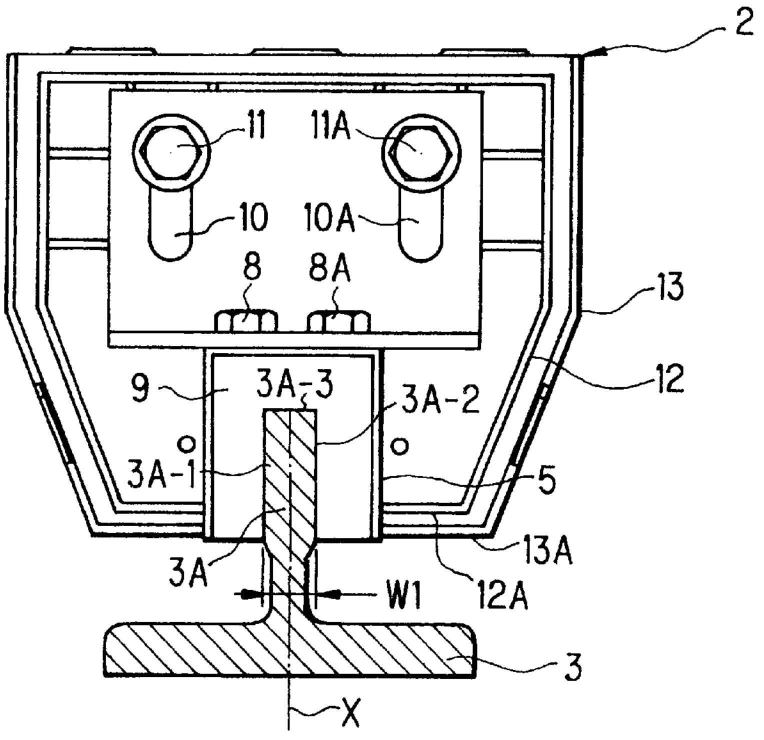
FIG. 2 also shows the same embodiment of the present invention, and is a bottom view of the guide rail lubricating device as mounted on the elevator.

A guide shoe 9 which has a turned square U shape in cross-section is fixedly press-fitted in the guide shoe support frame 5 as shown in FIG. 2. When the ascending/descending unit 4 is a car, the mount member 6 is mounted on a crosshead (not shown) which is located on a top of the car. As is depicted in FIG. 1 and FIG. 2, it is preferred to detachably mount the guide rail lubricating device 2 on the bracket 7 by means of bolts 11,11A which are maintained in engagement with slots 10,10A formed in the bracket 7. As is illustrated in FIG. 2, the guide shoe 9 is maintained in sliding contact with both sides walls 3A-1,3A-2 and an end wall 3A-3 of a guide portion 3A of the guide rail 3.

Figure 3:
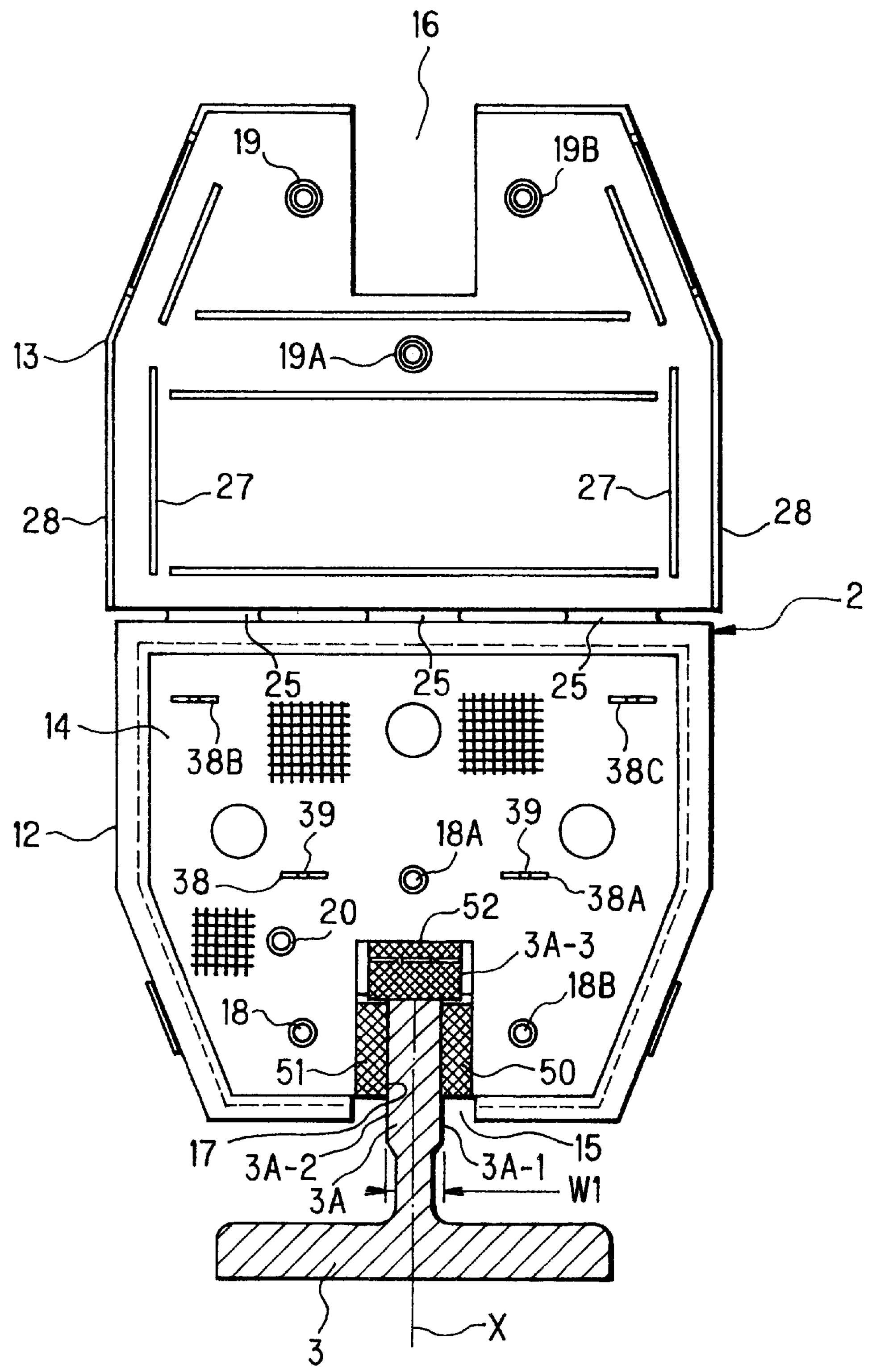
FIG. 3 also shows the same embodiment of the present invention, and is a plan view of the guide rail lubricating device as mounted on the elevator with a lid thereof being held in an opened position.
Figure 4:
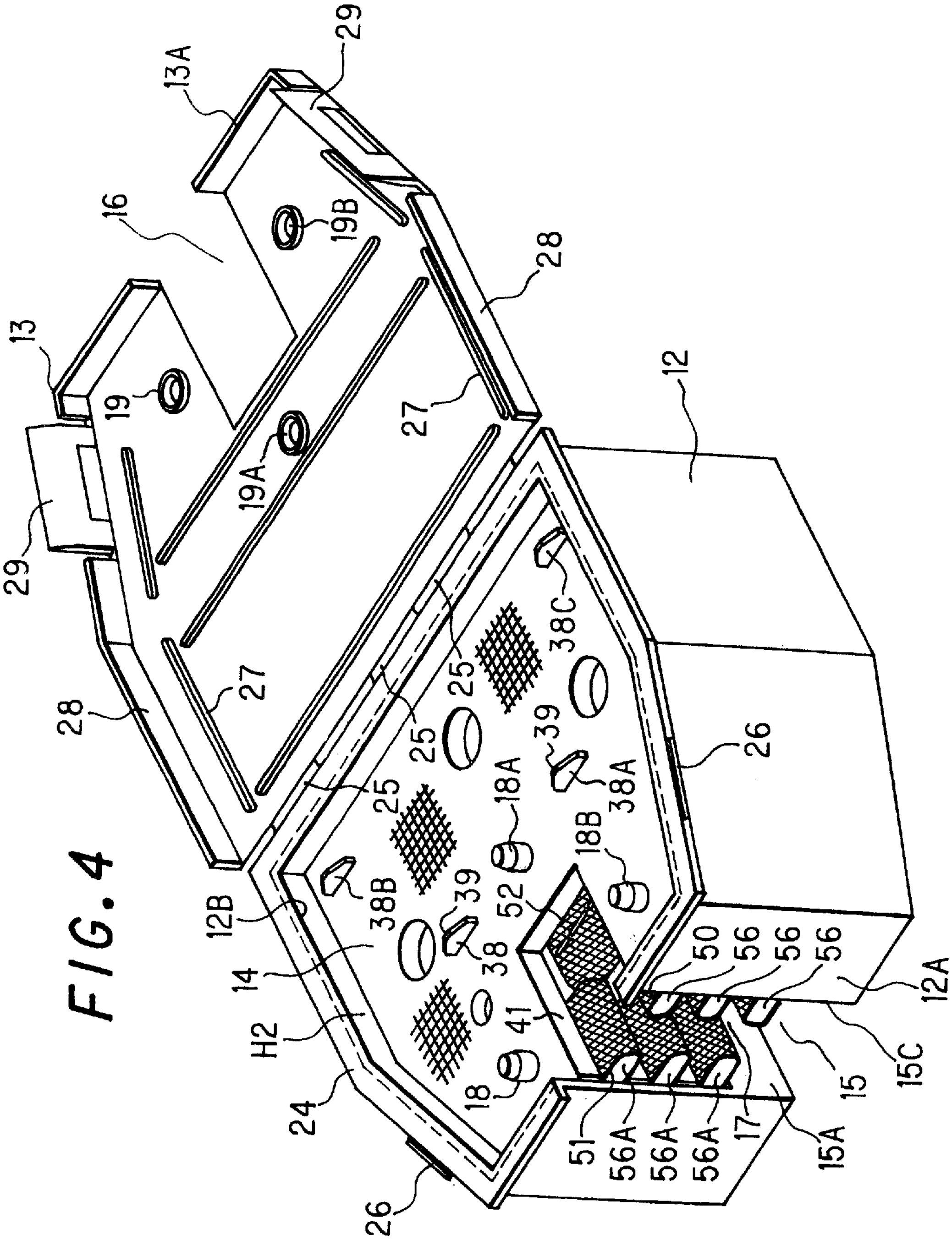
FIG. 4 also shows the same embodiment of the present invention, and is a perspective view of the guide rail lubricating device with the lid thereof being held in the opened position.
Figure 6:
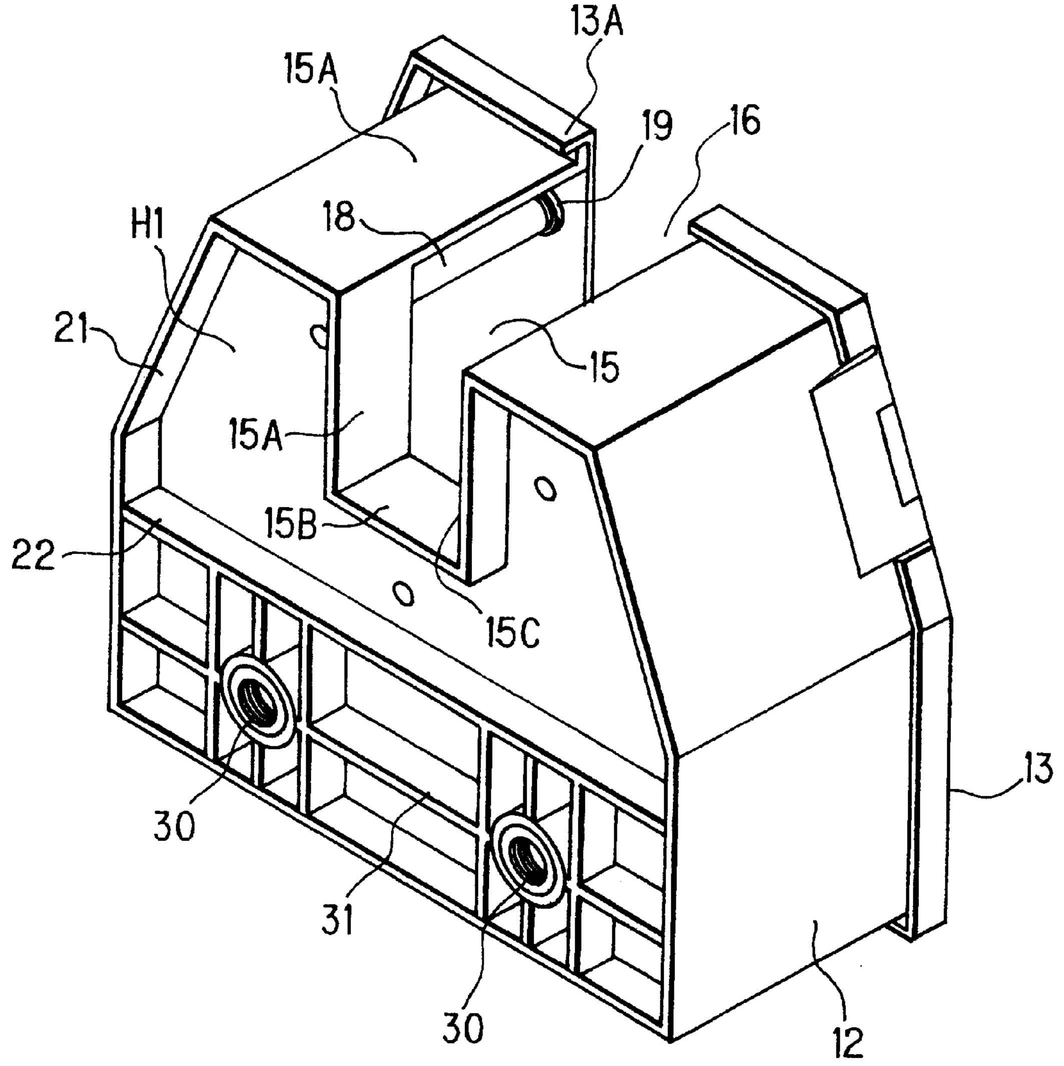
FIG. 6 also shows the same embodiment of the present invention, and is a perspective view of the case with the lid being held in the closed position.
Figure 7:
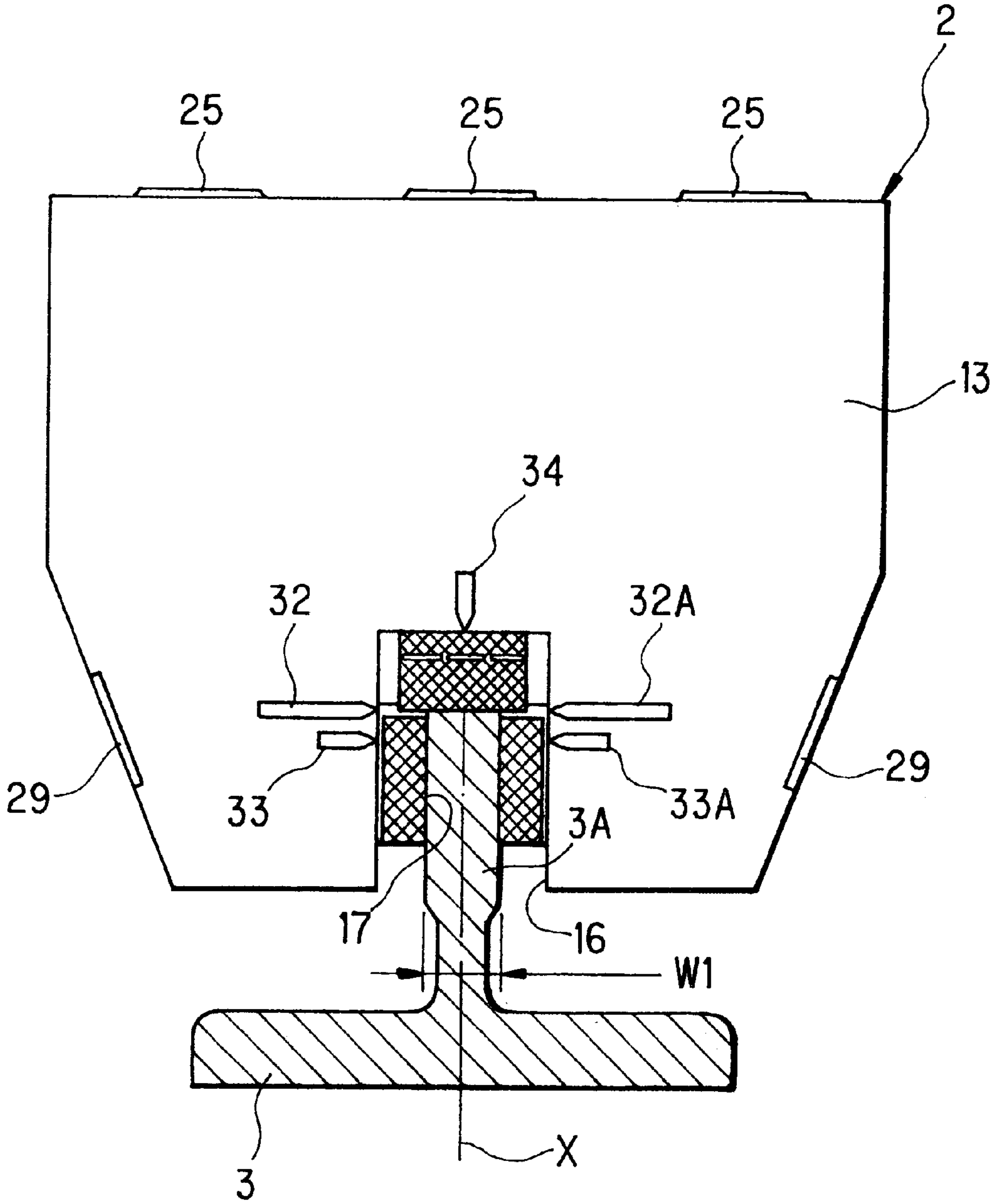
FIG. 7 also shows the same embodiment of the present invention, and is a plan view of the guide rail lubricating device as mounted on the elevator with the lid being held in the closed position.

As is shown in FIG. 1, FIG. 3 and FIG. 4, the guide rail lubricating device 2 is provided at least with a case 12 in the form of a bottomed box, said case being made of a synthetic resin, a lid 13 made of the synthetic resin and openably closing a top opening of the case 12, and an oil-retaining member 14 removably accommodated within the case 12. In the case 12, a recess 15 through which the guide portion 3A of the guide rail 3 can extend is formed in a substantially central part of a front wall 12A of the case 12 as shown in FIG. 3 and FIG. 6. In the lid 13, a recess 16 through which the guide portion 3A of the guide rail 3 can extend is formed in a substantially central part of a front wall 13A of the lid 13 as illustrated in FIG. 3 through FIG. 7. The oil-retaining member 14 is formed primarily of a material excellent in oil absorbing property and oil retaining property, for example, kapok, and has shape retaining property. As is depicted in FIG. 3, FIG. 4 and FIG. 7, a recess 17 through which the guide portion 3A of the guide rail 3 can extend is formed at a substantially central part of a front wall 14A (FIG. 8) of the oil-retaining member 14. Incidentally, the term "oil absorbing property" as used herein means oil adsorbing ability, the term "oil retaining property" as used herein means ability to retain a quantity of oil, and the term "kapok" as used herein means fibers contained in seeds of the ceiba tree.

Figure 5:
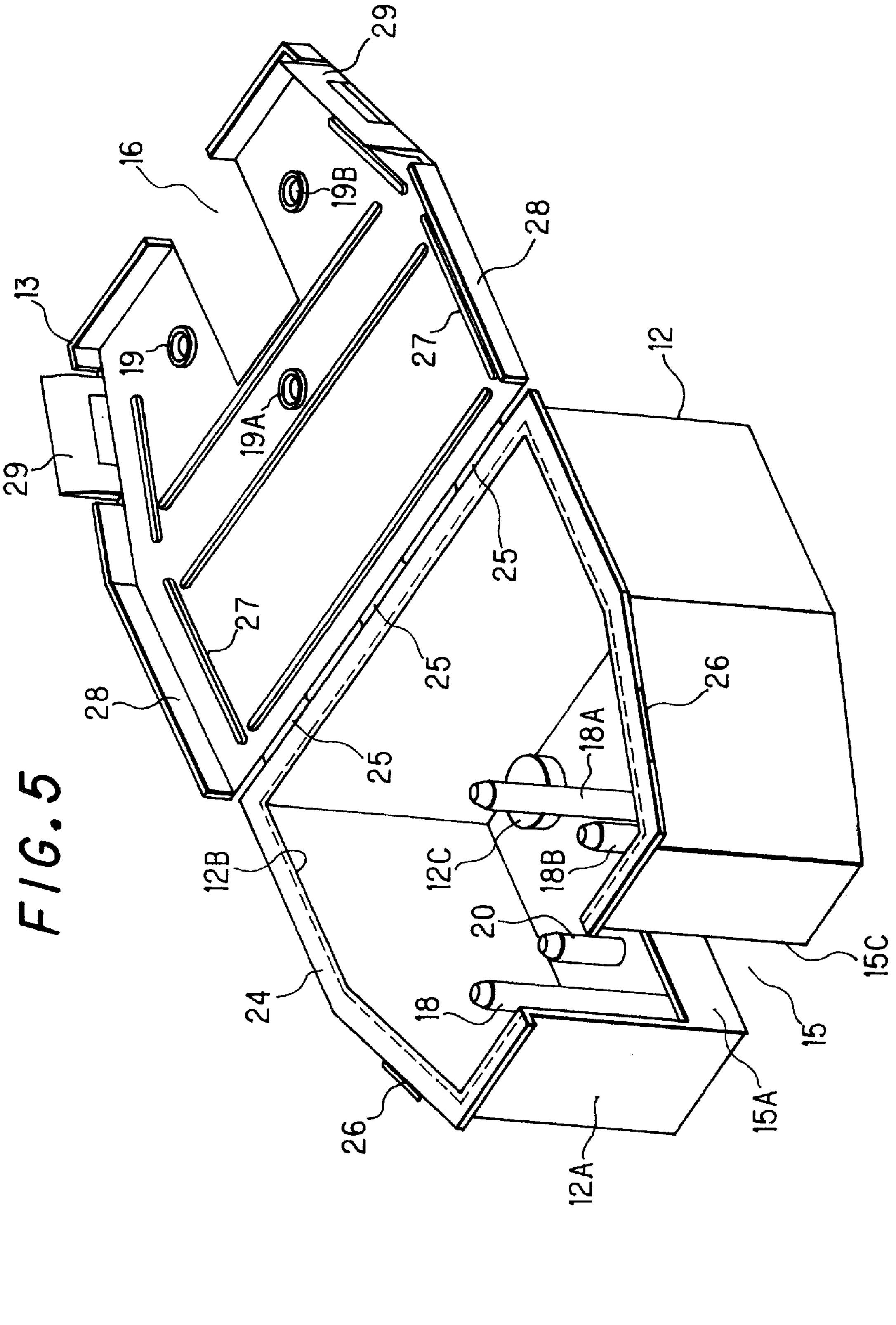
FIG. 5 also shows the same embodiment of the present invention, and is a perspective view of a case with the lid being held in the opened position.

On an inner bottom of the case 12, three pins 18,18A,18B made of the synthetic resin are integrally formed as illustrated in FIG. 5. The pins 18,18A,18B extend substantially upright from the inner bottom of the case 12 so that, when the lid 13 is a closed position, the pins 18,18A,18B are fitted at free ends thereof in ring-shaped sockets 19,19A,19B formed on an inner wall of the lid 13. The pin 18 is located adjacent a left-hand wall 15A of the recess 15 of the case 12. The pin 18A is located adjacent an end wall 15B (see FIG. 6) of the recess 15 of the case 12. The pin 18 is located adjacent a right-hand side wall 15C of the recess 15 of the case 12. The pin 18 and the pin 18B are arranged symmetrically on opposite sides of the recess 15 of the case 12. The pin 18A is located centrally rear of the end wall 15B of the recess 15 of the case 12. The pins 18,18A,18B are in the form of circular pins of 6 mm in diameter, but are not limited thereto. They may be in the form of square pins or oval pins.

On the inner bottom of the case 12, an inverted-setting preventing pin 20 is integrally formed to prevent the oil-retaining member 14 from being set up-side down within the case 12. The inverted-setting preventing pin 20 is a circular pin made of the synthetic resin and having a diameter of 6 mm, and is as long as about a half of the length of the pins 18,18A,18B. The inverted-setting preventing pin 20 may however be formed in the same length as the pins 18,18A, 18B.

As is illustrated in FIG. 6, an outer bottom of the case 12 is provided with a surrounding rib 21 formed on and along an entire outer peripheral end edge of the outer bottom, and also with a reinforcing rib 22 formed inside the surrounding rib 21. Within a space formed by the surrounding rib 21 and the reinforcing rib 22, the bolts 11,11A for use in mounting the case 12 on the ascending/descending unit 4 can be held until the case 12 is mounted on the ascending/descending unit 4.

A horizontal flange 24 is formed on and along an entire upper end periphery of the case 12 as shown in FIG. 3 through FIG. 5. On this horizontal flange 24, hinge portions 25 and two resilient rib-shaped lock elements 26 are formed. The hinge portions 25 attach the lid 13 to the case 12 such that the lid 13 can be opened and closed as desired, while the resilient rib-shaped lock elements 26 act to keep a top opening 12B of the case 12 closed when the top opening 12B is closed by the lid 13. Arranged on an inner wall of the lid 13 are deformation preventing ribs 27 which can be brought into contact with an inner edge of the top opening 12B of the case 12 when the top opening 12B of the case 12 is closed by the lid 13. An upright flange 28 is formed on an outer peripheral edge of the lid 13 except for a part corresponding to the recess 16 of the lid 13. The upright flange 28 is located outside the horizontal flange 24 of the case 12 when the top opening 12B of the case 12 is closed by the lid 13. The upright flange 28 of the lid 13 is provided with two resilient lock elements 29 formed thereon. In the state that the top opening 12B of the case 12 is closed by the lid 13, the resilient rib-shaped lock elements 26 are maintained in resilient engagement with the corresponding resilient lock elements 29 so that the closed position of the lid 13 is maintained. To open the lid 13, it is only necessary to outwardly deform the resilient lock elements 29 to release the engagement between the resilient rib-shaped lock elements 26 and the resilient lock elements 29 and then to lift the lid 13 upwards. The hinge portions 25 have a plastic hinge structure. The case 12 is dimensioned to have a volume such that an oil-holding space H2 is formed between an upper surface of the oil-retaining member 14 and a horizontal plane, in which an upper edge of the case 12 lies, when the oil-retaining member 14 accommodated within the case 12 has been fully impregnated with lubricating oil.

In the outer bottom of the case 12, two internal thread elements 30 made of a metal such as gun metal are embedded as shown in FIG. 6. By bringing the bolts 11,11A into threaded engagement with the two internal thread elements 30 with the bracket 7 interposed therebetween, the case 12 is fixed on an upper surface of the bracket 7. On the outer bottom of the case 12 at locations around the internal thread elements 30, many partition ribs 31 are arranged for reinforcement. Disks 12C (FIG. 5) are formed on the inner bottom of the case 12 to permit the embedding of the internal thread elements 30 in the outer bottom of the case 12.

As is illustrated in FIG. 7, the lid 13 is provided at left-hand and right-hand side peripheral edges of the recess 16 with first insertion positioning indicators 32,32A and second insertion positioning indicators 33,33A, which serve as references for determining the inserted position of the guide portion 3A upon its insertion into the recess 17 in the oil-retaining member 14 accommodated within the case 12. The lid 13 is also provided on the upper surface thereof at a periphery of the end edge of the recess 16 with a center positioning indicator 34, which facilitates alignment of a center of the end edge of the recess 16 with a center position X of the guide portion 3A as viewed in the direction of a width W1. In the state that the top opening 12B of the case 12 is closed by the lid 13, the center of the end edge 15B (FIG. 6) of the recess 15 of the case 12 and the center of the end edge of the recess 16 of the lid 13 are substantially registered with each other. Alignment of the center positioning indicator 34 with the center position X of the guide portion 3A as viewed in the direction of the thickness W1 therefore makes it possible to centrally arrange the guide portion 3A in the recess 15 of the case 12 and the recess 16 of the lid 13 as shown in FIG. 7. The case 12 and the lid 13 are designed to be usable commonly for two types of guide rails, namely, for a 13K guide rail and an 8K guide rail. The recess 15 of the case 12 and the recess 16 of the lid 13 are dimensioned large enough to receive therein a guide portion of a 13K guide rail without any problem. It is also necessary to provide two types of oil-retaining members 14, one for use with a 13K guide rail and the other for use with an 8K guide rail. By choosing the corresponding one of the two types of oil-retaining members 14, the case 12 and the lid 13 can be used for either the 13K guide rail or the 8K guide rail.

To arrange the guide rail lubricating device 2 on the 13K guide rail, it is only necessary to shift the case 12 on the bracket 7 by making use of the slots 10,10A formed in the bracket 7 so that the positions of the first insertion positioning indicators 32,32A of the lid 13 and the position of the end wall 3A-3 of the guide portion 3A are brought into registration, and then to fix the case 12 on the bracket 7 by the bolts 11,11A. To arrange the guide rail lubricating device 2 on the 8K guide rail, on the other hand, it is only necessary to shift the case 12 on the bracket 7 by making use of the slots 10,10A formed in the bracket 7 so that the positions of the second insertion positioning indicators 33,33A of the lid 13 and the position of the end wall 3A-3 of the guide portion 3A are brought into registration, and then to fix the case 12 on the bracket 7 by the bolts 11,11A.

Figure 8:
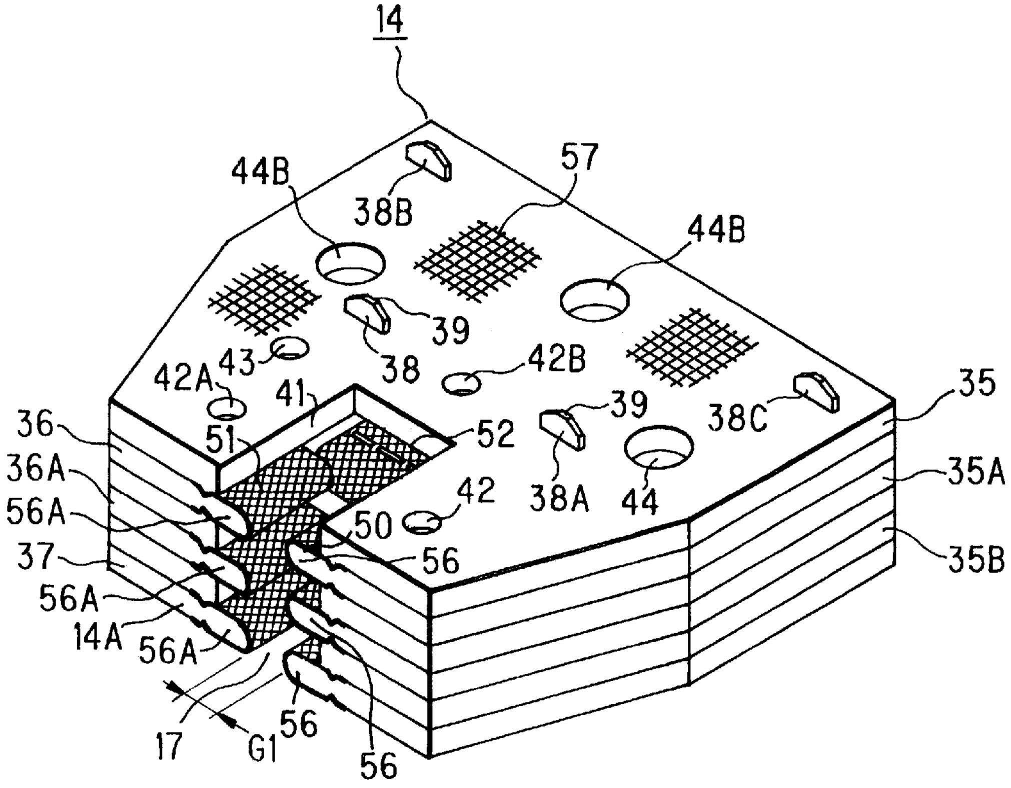
FIG. 8 also shows the same embodiment of the present invention, and is a perspective view of an oil-retaining member.
Figure 9:
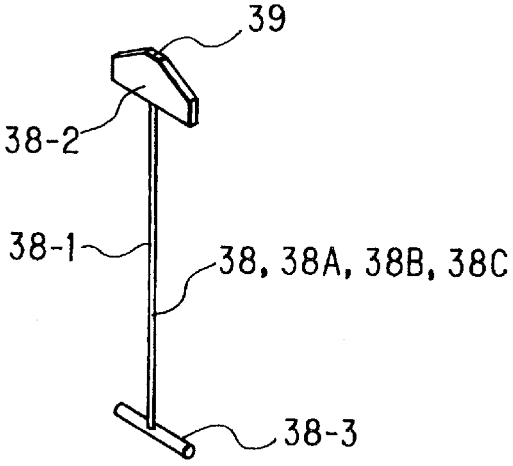
FIG. 9 also shows the same embodiment of the present invention, and is a perspective view of a fastening member.

The oil-retaining member 14 shown in FIG. 3, FIG. 4 and FIG. 8 is for use with a 13K guide rail. The oil-retaining member 14 is provided with three types of oil-retaining sheets, which consist of non-contact oil-retaining sheets 35,35A,35B maintained out of contact with the guide portion 3A, first contact oil-retaining sheets 36,36A and a second contact oil-retaining sheet 37. The oil-retaining member 14 is fabricated by stacking the three non-contact oil-retaining sheets 35,35A,35B, the two first contact oil-retaining sheets 36,36A and the single second contact oil-retaining sheet 37 one over the other as shown in FIG. 8 and then tightening them together with four fastening members 38,38A,38B,38C. As is illustrated in FIG. 9, each of the four fastening members 38,38A,38B,38C is composed of a string portion 38-1, an upper end stopper 38-2 integrally formed at an upper end of the string portion 38-1, and a rod-shaped lower end stopper 38-3 integrally formed at a lower end of the string portion 38-1. The upper end stopper 38-2 is also formed as a finger grip member 39 for being used to lift the oil-retaining member 39. The string portion 38-1, the upper end stopper 38-2, the rod-shaped lower end stopper 38-3 and the finger grip member 39 are integrally formed with a synthetic resin. The finger grip member 39 has been formed by making the width of the upper end stopper 382 greater.

Figure 10:
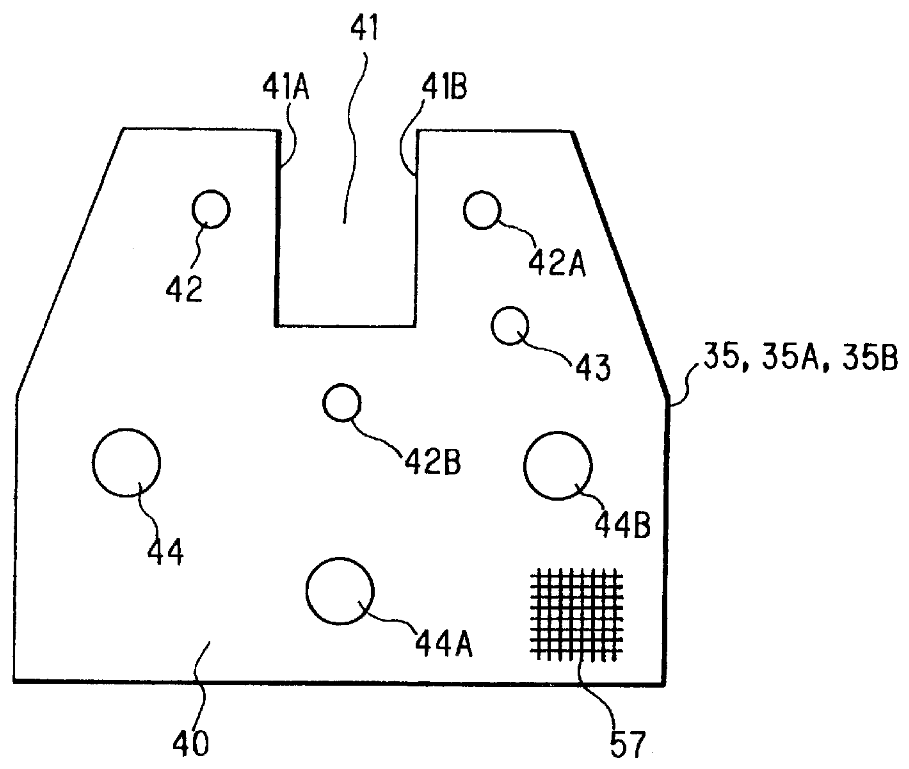
FIG. 10 also shows the same embodiment of the present invention, and is a plan view of a non-contact oil-retaining sheet.

As is shown in FIG. 10, each of the non-contact oil-retaining sheets 35,35A,35B is provided with a main body 40 made of kapok or the like, a recess 41 centrally formed in a side of the main body 40 and having a size large enough to avoid contact with the guide portion 3A, positioning through-holes 42,42A,42B permitting insertion of the pins 18,18A,18B therein, an inverted-setting preventing pin insertion bore 43 permitting insertion of the inverted-setting preventing pin 20 (FIG. 5) therein, and three oiling holes 44,44A, 44B having an opening area greater than the positioning through-holes 42,42A,42B.

Figure 11:
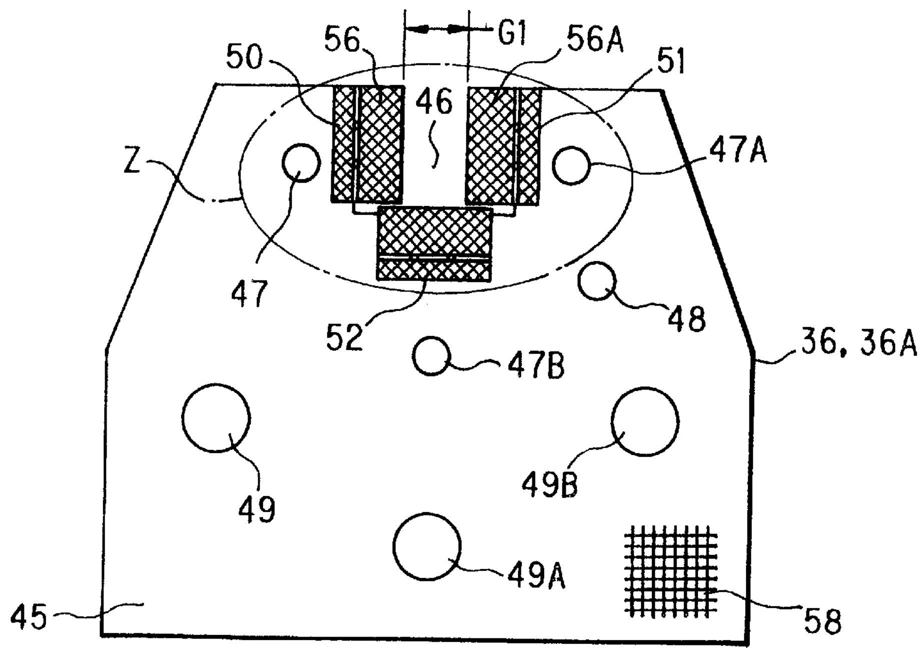
FIG. 11 also shows the same embodiment of the present invention, and is a plan view of a first contact oil-retaining sheet.

As is illustrated in FIG. 11, each of the first contact oil-retaining sheets 36,36A is provided with a main body 45 made of a material excellent in oil absorbing property and oil retaining property, for example, kapok, a recess 46 centrally formed in a side of the main body 45 and having a size small enough to permit contact with the guide portion 3A, positioning through-holes 47,47A,47B permitting insertion of the pins 18,18A,18B therein, an inverted-setting preventing pin insertion bore 48 permitting insertion of the inverted-setting preventing pin 20 therein, and three oiling holes 49,49A,49B having an opening area greater than the positioning through-holes 47,47A,47B. Side side edges 46A, 46B (FIG. 14) of the recess 46 in each of the first contact oil-retaining sheets 36,36A are provided with first wear-resistant meshes 50,51 which serve to prevent loosing of the associated side edges 46A,46B, respectively. An end edge 46C (FIG. 14) of the recess 46 in each of the first contact oil-retaining sheets 36,36A is provided with a second wear-resistant mesh 52 which serves to prevent loosing of the associated end edge 46C.

Figure 14:
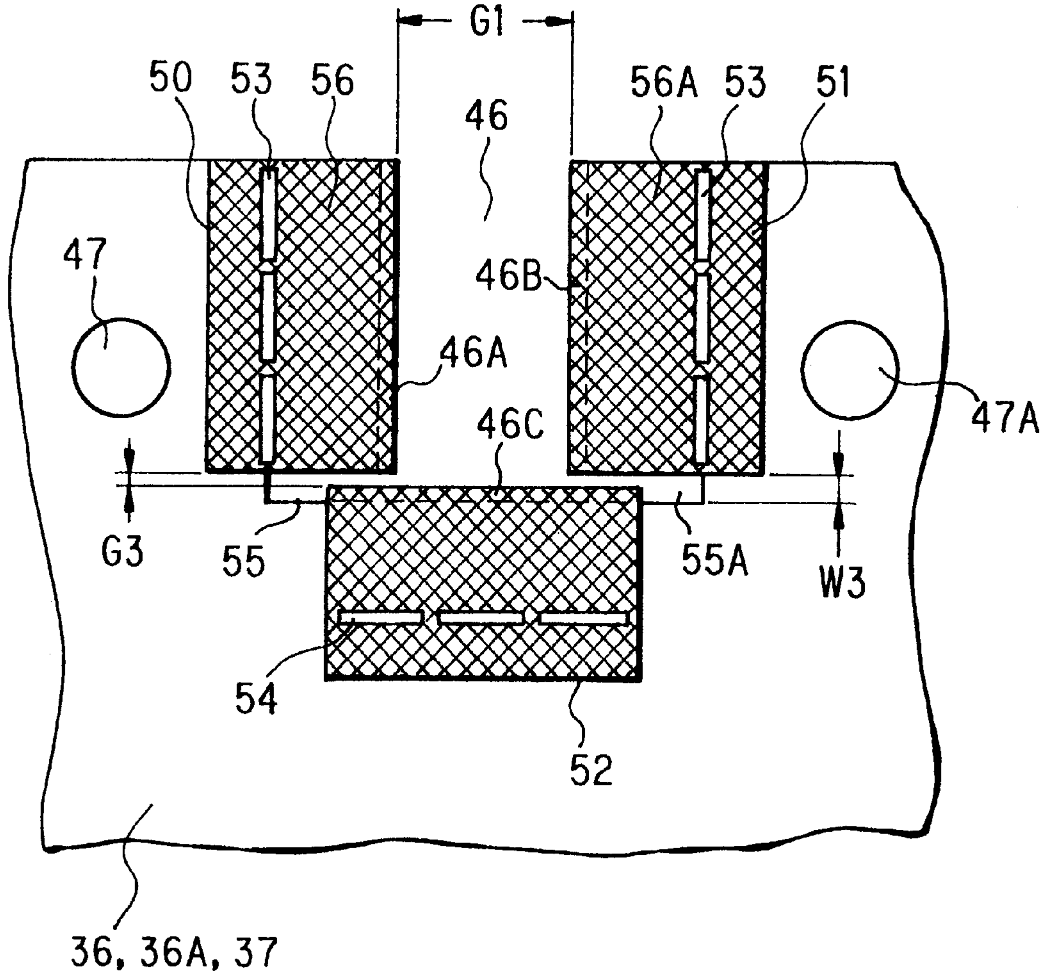
FIG. 14 is an enlarged view of a part Z of FIG. 11.

The first wear-resistant meshes 50,51 and the second wear-resistant mesh 52 are made of nylon fibers having a 140-denier diameter and are formed in knitted structures of approximately 1 mm in thickness. As the first wear-resistant meshes 50,51 and the second wear-resistant mesh 52, those having the same dimensions and made of the same material are used. The first wear-resistant meshes 50,51 are sewn on the corresponding side edges 46A,46B of the recess 46 at three locations by tacks 53 made of a synthetic resin (FIG. 14). The second wear-resistant mesh 52 is sewn on the end edge 46C of the recess 46 at three locations by tacks 54 made of the synthetic resin (FIG. 14). The sewn parts of the first wear-resistant meshes 50,51 by the tacks 53 in each of the contact oil-retaining sheets 36,36A,37 are formed to extend substantially in parallel with the corresponding side edges 41A,41B of the recess 41 in the adjacent non-contact oil-retaining sheet 35 35A or 35B. By sewing the first wear-resistant meshes 50,51 with the tacks 53 after covering edge surfaces and upper and lower surfaces of the side edges 46A,46B of the recess 46 in a close contact state, it is designed to avoid formation of a space between the first wear-resistant meshes 50,51 and the corresponding first contact oil-retaining sheet 36 or 36A. By sewing the second wear-resistant mesh 52 with the tacks 54 after covering an edge surface and upper and lower surfaces of the end edges 46C of the recess 46 in a close contact state, it is also designed to avoid formation of a space between the second wear-resistant mesh 52 and the corresponding first contact oil-retaining sheet 36 or 36A.

Between the side edges 46A,46B and the end edge 46 of the recess 46 in each of the first contact oil-retaining sheets 36,36A, slits 55,55A are formed extending alongside extensions of the end edge 46C. Owing to the formation of the slits 55,55A, tongue portions 56,56A which are covered by the corresponding first wear-resistant meshes 50,51 are formed on the opposite sides of the recess 46 in each of the first contact oil-retaining sheets 36,36A. By making the cut width W3 of the slits 55,55A greater than the thickness of the second wear-resistant mesh 52 as shown in FIG. 14, a gap G3 is formed between the tongue portions 56,56A and the end edge 49C so that the tongue portions 56,56A are maintained out of contact with the second wear-resistant mesh 52. The cut width W3 is set at approximately 2 mm.

As the base portions of the tongue portions 56,56A are in registration with the sewn parts by the tacks 53, the tongue portions 56,56A are inwardly sunken at both sides of the base portions. In other words, the tongue portions 56,56A are constricted at the base portions thereof by the tacks 53. Accordingly, the tongue portions 56,56A are in such a construction that they are readily swingable about the base portions thereof. The size of the recess 46 in each of the first contact oil-retaining sheets 36,36A is set such that the dimension G1 (FIG. 14) of the spacing between the tongue portions 56,56A is smaller than the dimension W1 of the thickness of the guide portion 3A. In the case of a 13K guide rail, for example, the dimension G1 of the spacing between the tongue portions 56,56A is set at approximately 12 mm as opposed to approximately 16 mm as the dimension W1 of the thickness of the guide portion 3A. When the guide rail lubricating device 2 is caused to ascend and descend along the guide portion 3A, the tongue portions 56,56A are maintained in sliding contact with the corresponding side walls 3A-1,3A-2 of the guide portion 3A under appropriate pushing force. On the other hand, the second wear-resistant mesh 52 arranged on the end edge 46C of the recess 46 is designed such that its free end undergoes light sliding contact with the end walls 3A-3 of the guide portion 3A. In other words, the pressing force of the first wear-resistant meshes 50,51 against the corresponding side walls 3A-1,3A-2 of the guide portion 3A is set greater than the pressing force of the second wear-resistant mesh 52 against the end wall 3A-3 of the guide portion 3A.

Figure 12:
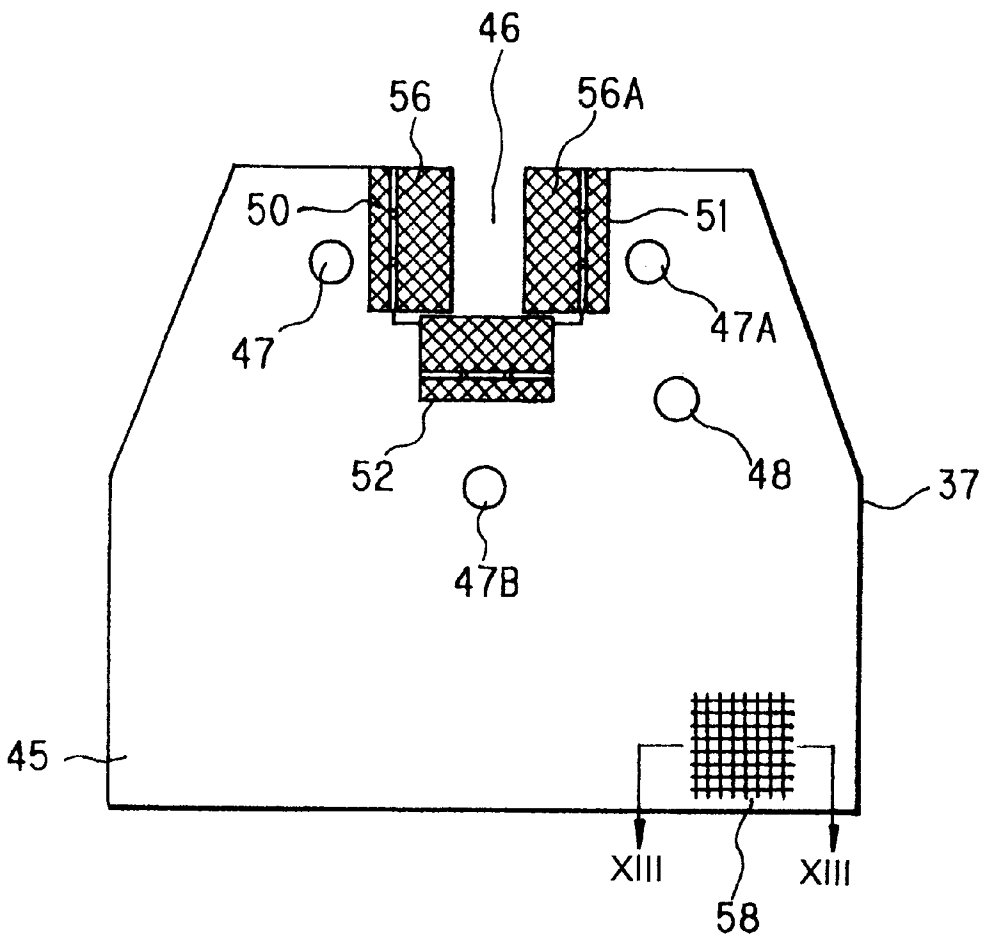
FIG. 12 also shows the same embodiment of the present invention, and is a plan view of a second contact oil-retaining sheet.

The second contact oil-retaining sheet 37 has a structure such as that shown in FIG. 12. In FIG. 12, those reference signs which also appear in FIG. 11 indicate like elements. As is appreciated from FIG. 12, the first contact oil-retaining sheets 36,36A and the second contact oil-retaining sheet 37 are different only in that the former are provided with the oiling holes 49,49A,49B but the latter is not provided with the oiling holes 49,49A,49B. Incidentally, the second contact oil-retaining sheet 37 and the first contact oil-retaining sheets 36,36A will hereinafter be called "the contact oil-retaining sheets" when they will be collectively referred to.

Figure 13:
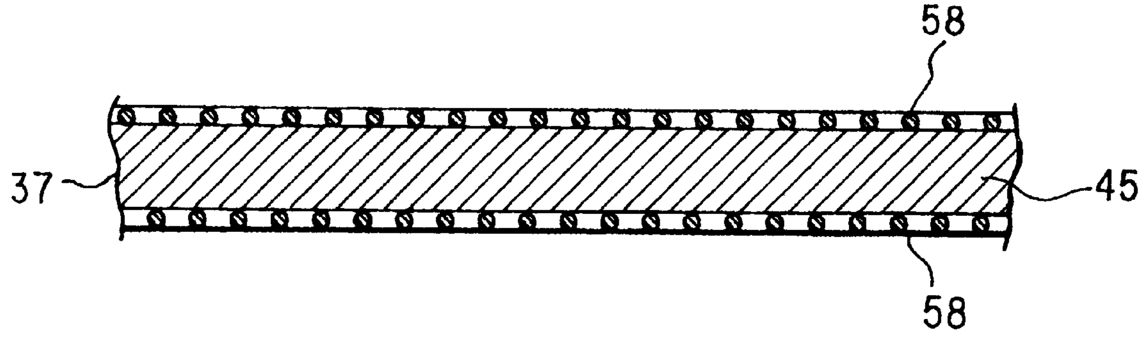
FIG. 13 is an enlarged cross-sectional view taken in the direction of arrows XIII—XIII of FIG. 12.

Each of the non-contact oil-retaining sheets 35,35A,35B is covered at the entire upper and lower sides of its main body 40 by a mesh 57. As is depicted in FIG. 13, each of the first contact oil-retaining sheet 36,36A and the second contact oil-retaining sheet 37 is covered at the entire upper and lower sides of its main body 45 by a mesh 58. The meshes 57,58 have been formed by knitting nylon yarns of approximately 0.2 mm in diameter into grid patterns. The main body 40 of each of the non-contact oil-retaining sheets 35,35A, 35B is fabricated by putting kapok together to a thickness of approximately 6 mm to form a sheet-like preform, laying the mesh 57 over the entire upper and lower sides of the sheet-like preform, and then cutting the sheet-like preform and the mesh 57 together in a desired size.

As is illustrated in FIG. 8, the oil-retaining member 14 is formed by stacking the second contact oil-retaining sheet 37, the non-contact oil-retaining sheet 35B, the first contact oil-retaining sheet 36A, the non-contact oil-retaining sheet 35A, the first contact oil-retaining sheet 36 and the non-contact oil-retaining sheet 35 one over the other in the order as they are presented. In other words, the oil-retaining member 14 is formed by alternately stacking the non-contact oil-retaining sheets 35,35A,35B and the contact oil-retaining sheets 36,36A,37 one over the other. As a result, the recess 17 of the oil-retaining member 14 is formed by the recesses 41 of the non-contact oil-retaining sheets 35,35A,35B and the recesses 46 of the first contact oil-retaining sheets 36,36A and second contact oil-retaining sheet 37. In the recess 17 of the oil-retaining member 14, the tongue portions 56,56A covered by the first wear-resistant meshes 50,51 are arranged side by side and also with vertical intervals equivalent to the thickness of the non-contact oil-retaining sheets 35,35A,35B. Further, the widthwise center positions of the recesses 41 of the non-contact oil-retaining sheets 35,35A, 35B, the widthwise center positions of the first contact oil-retaining sheets 36,36A and the widthwise center position of the second contact oil-retaining sheet 37 are substantially registered with each other. When the center positioning indicator 34 of the lid 13 is brought into registration with the widthwise center position of the recess 17 in the oil-retaining member 14, the first wear-resistant meshes 50,51 of the first contact oil-retaining sheets 36,36A and the first wear-resistant meshes 50,51 of he second contact oil-retaining sheet 37 are maintained in sliding contact with the side walls 3A-1,3A-2 of the guide portion 3A of the guide rail 3 symmetrically relative to the center position X of the guide portion 3A.

The main bodies 40 of the non-contact oil-retaining sheets 35,35A,35B and the main bodies 45 of the first contact oil-retaining sheets 36,36A and the second contact oil-retaining sheet 37, except for the recesses 41 and the recesses 46, have the same contour and dimensions. Moreover it is designed such that, when the non-contact oil-retaining sheets 35,35A,35B and the contact oil-retaining sheets 36,36A,37 are alternately stacked one over the other, the positioning through-holes 42,42A,42B arranged in the main bodies 40 of the non-contact oil-retaining sheets 35,35A,35B and the positioning through-holes 47,47A,47B arranged in the main bodies 45 of the first contact oil-retaining sheets 36,36A and second contact oil-retaining sheet 37 are registered with each other, the inverted-setting preventing pin insertion bores 43 arranged in the main bodies of the non-contact oil-retaining sheets 35,35A,35B and the inverted-setting preventing pin insertion bores 48 arranged in the main bodies 45 of the first contact oil-retaining sheets 36,36A and second contact oil-retaining sheet 37 are registered with each other, and the oiling holes 44,44A,44B arranged in the main bodies 40 of the non-contact oil-retaining sheets 35,35A,35B and the oiling holes 49,49A,49B arranged in the main bodies 45 of the first contact oil-retaining sheets 36,36A are also registered with each other. As a result, oilways 59 (FIG. 15) are formed in the oil-retaining member 14, extending from the upper side of the non-contact oil-retaining sheet 35 to the upper side of the second oil-retaining sheet 37, because the main body 45 of the second contact oil-retaining sheet 37 does not have the oilways 49,49A,49B.

The positioning through-holes 42,42A,42B and the positioning through-holes 47,47A,47B are dimensioned to have a diameter of approximately 6.5 mm. The oiling holes 44,44A,44B and the oiling holes 49,49A,49B are dimensioned to have a diameter of approximately 12 mm. The inverted-setting preventing pin insertion bore 43 and the inverted-setting preventing pin insertion bore 48 are dimensioned to have a diameter of approximately 6.5 mm. The pins 18,18A,18B are tapered at free ends thereof to facilitate their insertion into the positioning through-holes 42,42A, 42B and the positioning through-holes 47,47A,47B. The inverted-setting preventing pin 20 is also tapered at a free end thereof to facilitate its insertion into the inverted-setting preventing pin insertion bore 43 and the inverted-setting preventing pin insertion bore 48.

To convert the guide rail lubricating device 2 for a 13K guide rail into a guide rail lubricating device for an 8K guide rail, provision of an oil-retaining member for the 8K guide rail is only needed as the case 12 and the lid 13 for openably closing the top opening of the case 12 can be used as are. The oil-retaining member for the 8K guide rail and the oil-retaining member 14 for the 13K guide rail are substantially the same in construction, and are different only in the size of the recess through which the guide portion of the 8K guide rail extends.

To use the guide rail lubricating device 2 of the above-described embodiment, it is only necessary to bring the center positioning indicator 34, with the lid 13 held in the closed position, into registration with the widthwise center position of the recess 17 in the oil-retaining member 14, to bring the position of the end wall 3A-3 of the guide portion 3A into registration with the positions of the first insertion positioning indicators 32,32A and then to fix the case 12 on the bracket 7 by the bolts 11,11A.

The lid 13 is then opened, and the pins 18,18A,18B and the inverted-setting preventing pin 20 are next inserted into the positioning through-holes 42,42A,42B,47,47A,47B of the oil-retaining member 14 and the inverted-setting preventing pin insertion bores 43,48 of the oil-retaining member 14, respectively. As a consequence, the oil-retaining member 14 is arranged with the case 12 as shown in FIG. 4. If one attempts at this time to place the oil-retaining member 14 up-side down in the case 12, in other words, to place the oil-retaining 14 in the case 12 with the second contact oil-retaining sheet 37 being positioned at the top, the inverted-setting preventing pin insertion bores 43,48 become offset from the position where the inverted-setting preventing pin 20 is located. The inverted-setting preventing pin 20 cannot therefore be inserted into the inverted-setting preventing pin insertion bores 43,48, so that the oil-retaining member 14 cannot be arranged within the case 12. As a consequence, it is possible to prevent the oil-retaining member 14 from being arranged up-side down in the case 12. Further, as the oil-retaining member 14, the non-contact oil-retaining sheets 35,35A,35B, the first contact oil-retaining sheets 36,36A and the second contact oil-retaining sheet 37 are used in the form of a fastened unit instead of arranging the non-contact oil-retaining sheets 35,35A,35B, the first contact oil-retaining sheets 36,36A and the second contact oil-retaining sheet 37 one after one in the case 12. The arrangement work of the retaining member 14 in the case 14 can therefore be performed easily in a short time.

A predetermined quantity of lubricating oil is then poured by an oil feeding funnel (oiler) into the oiling holes 44,44A, 44B of the non-contact oil-retaining sheet 35 in the oil-retaining member 14. The lubricating oil, which has been poured into the oiling holes 44,44A,44B, is instantaneously allowed to flow through the oilways 59 to the upper side of the second contact oil-retaining sheet 37 located in the bottom part of the case 12 so that the second contact oil-retaining sheet 37 is soaked with the lubricating oil. At the same time, the lubricating oil is also allowed to smoothly penetrate from the oilways 59 via the meshes 57,58 to both the upper and lower sides of the first contact oil-retaining sheets 36,37A and non-contact oil-retaining sheet 35A,35B, which are located between the non-contact oil-retaining sheet 35 and the second contact oil-retaining sheet 37, and also to the entire lower side of the non-contact oil-retaining sheet 35 and the entire upper side of the second contact oil-retaining sheet 37. The oiling time of the lubricating oil can therefore be shortened. In this embodiment, the second contact oil-retaining sheet 37 is free of the oiling holes 44,44A,44B, so that this embodiment is free of such a problem that the lubricating oil may instantaneously flow to the inner bottom of the case 12 through the oilways 59 and may hence over-flow from the case 12.

Figure 15:
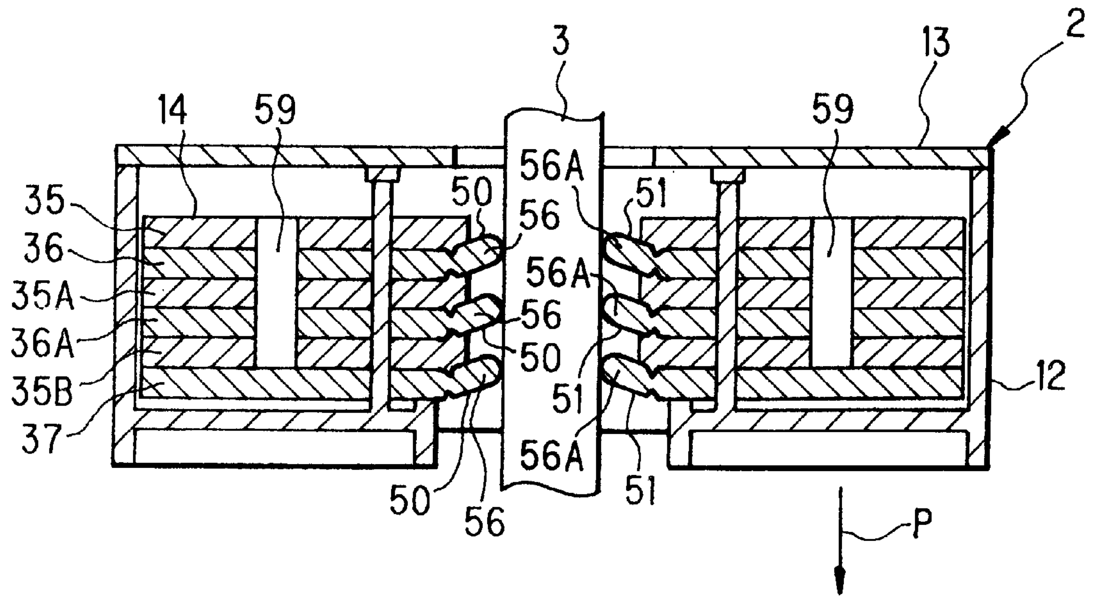
FIG. 15 also shows the same embodiment of the present invention, and is a schematic view illustrating operation of essential elements of the guide rail lubricating device during descending operation.
Figure 16:
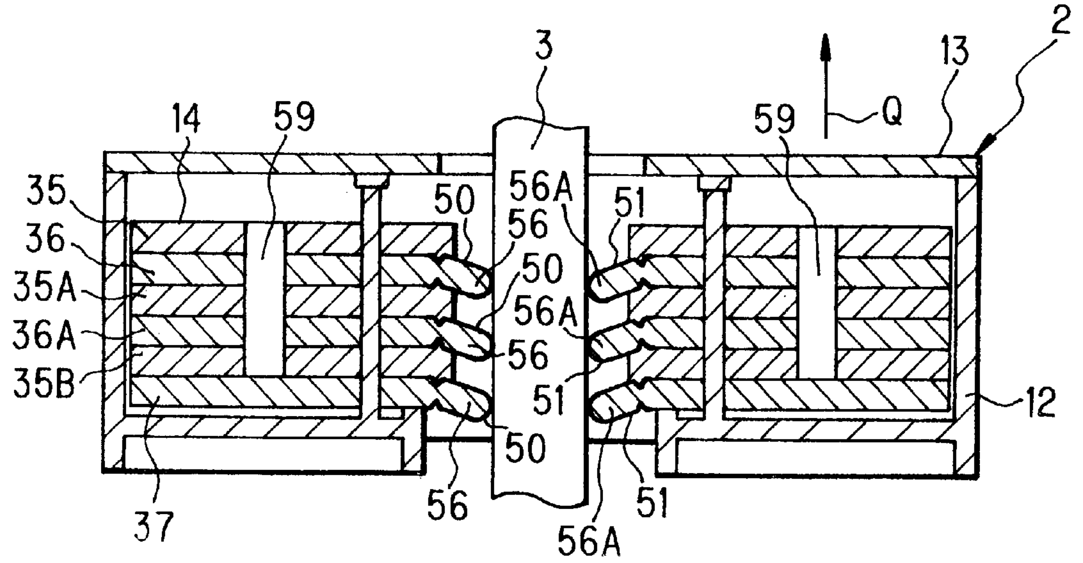
FIG. 16 also shows the same embodiment of the present invention, and is a schematic view illustrating operation of the essential elements of the guide rail lubricating device during ascending operation.

When the lid 13 is closed and the ascending/descending unit 4 is then caused to descend, each tongue portion 56 covered by the corresponding first wear-resistant mesh 50 is upwardly swung about the base portion thereof and is hence brought into sliding contact with the side wall 3A-1 of the guide portion 3A, as is illustrated in FIG. 15. Like the tongue portion 56 covered by the first wear-resistant mesh 50, each tongue portion 56A covered by its corresponding first wear-resistant mesh 51 is also upwardly swung about the base portion thereof and is hence brought into sliding contact with the side wall 3A-2 of the guide portion 3A. When the ascending/descending unit is caused to ascend, on the other hand, each tongue portion 56 covered by the corresponding first wear-resistant mesh 50 is downwardly swung about the base portion thereof and is hence brought into sliding contact with the side wall 3A-1 of the guide portion 3A, as is illustrated in FIG. 16. Like the tongue portion 56 covered by the first wear-resistant mesh 50, each tongue portion 56A covered by its corresponding first wear-resistant mesh 51 is also downwardly swung about the base portion thereof and is hence brought into sliding contact with the side wall 3A-2 of the guide portion 3A. In this embodiment, the second wear-resistant mesh 52 is designed to remain out of contact with the tongue portions 56,56A covered by the first wear-resistant meshes 50,51 owing to the formation of the gap G3 by the arrangement of the slits 55,55A, which have the cut width W3 greater than the thickness of the second wear-resistant mesh 52, between the side edges 46A,46B and the end edge 46C of the recess 46 in the corresponding one of the first contact oil-retaining sheets 36,36A and second contact oil-retaining sheet 37 as illustrated in FIG. 14. The tongue portions 56,56A are therefore resistant to outward flaring which would otherwise occur as a result of outward pushing of the second wear-resistant mesh 52 by the tongue portions 56,56A. Accordingly, the whole tongue portions 56,56A are allowed to undergo uniform sliding contact with the side walls 3A-1,3A-2 of the guide portion 3A. This makes it possible to efficiently perform coating of lubricating oil to the side walls 3A-1,3A-2 of the guide portion 3A and moreover, to avoid exertion of unduly large force against the tongue portions 56,56A so that the first wear-resistant mesh 50,51 covering the tongue portions 56,56A are provided with longer service life. Even if lubricating oil should be overcoated on the side walls 3A-1,3A-2 of the guide portion 3A, any extra lubricating oil can be absorbed back toward the tongue portions 56,56A by the kapok forming the tongue portions 56,56A because the whole tongue portions 56,56A are maintained in uniform sliding contact with the side walls 3A-1,3A-2 of the guide portion 3A. Lubricating oil therefore does not flow down into a pit of the elevator 1 along the guide rail 3.

Although the tongue portions 56,56A are maintained in sliding contact with the side walls 3A-1,3A-2 of the guide portion 3A, the tongue portions 56,56A are not positionally displaced in horizontal direction owing to the fitted insertion of the pins 18,18A,18B in the positioning through-holes 42,42A,42A, 47,47A,47B of the oil-retaining member 14. The tongue portions 56,56A therefore do not develop a one-side contacting phenomenon such that the tongue portion 56 becomes apart from the side wall 3A-1 of the guide portion 3A and the tongue portion 56A is strongly pressed against the side wall 3A-2 of the guide portion 3A or the tongue portion 56A becomes apart from the side wall 3A-2 of the guide portion 3A and the tongue portion 56 is strongly pressed against the side wall 3A-1 of the guide portion 3A. Lubricating oil is therefore surely coated on the side walls 3A-1,3A-2 of the guide portion 3A and the tongue portions 56,56A are prevented from being pressed under abnormally strong force against the side walls 3A-1,3A-2 of the guide portion 3A. The first wear-resistant meshes 50,51 are therefore protected from abnormal wearing.

As the sewn parts of the first wear-resistant meshes 50,51 by the tacks 53 extend substantially in parallel with the side edges 41A,41B of the recesses 41 in the non-contact oil-retaining sheets 35,35A,35B, the sewn parts act as the base portions of the tongue portions 56,56A when the tongue portions 56,56A are brought into sliding contact with the side walls 3A-1, 3A-2 of the guide portion 3A by causing the ascending/descending unit 4 to ascend or descend. The tongue portions 56,56A are therefore allowed to smoothly swing about the base portions. Further, the base portions of the tongue portions 56,56A are inwardly sunken on both sides thereof by the tacks 53. This also allows the tongue portions 56,56A to undergo smooth swinging upon their sliding contact with the side walls 3A-1,3A-2 of the guide portion 3A. Owing to this swinging of the tongue portions 56,56A, the parts of the tongue portions 56,56A at which sliding contact takes places with the side walls 3A-1,3A-2 of the guide portion 3A are not the same in every instance, and the sliding parts vary whenever the moving direction of the ascending/descending unit 4 changes. This has made it possible to provide the first wear-resistant meshes 50,51 with longer service life.

The first anti-wear meshes 50,51—which are arranged on the side edges 46A,46B of the recesses 46 in the first contact oil-retaining sheets 36,36A and second contact oil-retaining sheet 37—and the second anti-wear meshes 52—which are arranged on the end edges of the recesses 46 in the first contact oil-retaining sheets 36,36A and second contact oil-retaining sheet 37—are made of nylon fibers having a 140-denier diameter and are formed in knitted structures of approximately 1 mm in thickness, so that loosing will be observed neither on the first anti-wear meshes 50,51 maintained in sliding contact with the side walls 3A-1,3A-2 of the guide portion 3A nor on the second anti-wear meshes 52 maintained in sliding contact with the end wall 3A-3 of the guide portion 3A. According to an experiment conducted with the guide rail lubricating device 2 kept arranged on an elevator which was used very frequently, absolutely no loosing was observed on the first anti-wear meshes 50,51 and the second anti-wear meshes 52 even after an elapsed time of 1 year. Moreover, scuff of the first anti-wear meshes 50,51 and the second anti-wear meshes 52 was controlled below normally-operating sound of the elevator, thereby demonstrating a noise reduction.

The second anti-wear meshes 52 arranged on the end edges 46C of the recesses 46 in the first contact oil-retaining sheets 36,36A and second contact oil-retaining sheet 37 are arranged such that they are maintained in light sliding contact at the free edges thereof with the end wall 3A-3 of the guide portion 3A. The end edges 46 are therefore protected from being caused to swing under strong force.

Owing to the light sliding contact of the second anti-wear meshes 52 with the end wall 3A-3 of the guide portion 3A and the setting of the dimension G1 of the spacing between the tongue portions 56,56A at a level smaller than the dimension W1 of the thickness of the guide portion 3A, the pressing force of the first anti-wear meshes 50,51 against the side walls 3A-1,3A-2 of the guide portion 3A becomes greater than the pressing force of the second anti-wear meshes 52 against the end wall 3A-3 of the guide portion 3A. This makes it possible to assure thorough coating of lubricating oil to the side walls 3A-1,3A-2 of the guide portion 3A and also to perform coating of lubricating oil to the end wall 3A-3 of the guide portion 3 without significant deformation of the second anti-wear meshes 52.

Further, owing to the alternate stacking of the non-contact oil-retaining sheets 35,35A,35B and the contact oil-retaining sheets 36,36A,37, escape spaces are formed over and under the tongue portions 56,56A. Upon sliding contact of the tongue portions 56,56A with the side walls 3A-1,3A-2 of the guide portion 3A, the tongue portions 56,56A are therefore protected from being strongly squeezed between the corresponding side walls 3A-1,3A-2 and the adjacent other tongue portions 56,56A. Lubricating oil is hence not caused to excessively flow out toward the side walls 3A-1,3A-2 of the guide portion 3A.

In addition, by alternately stacking the three the non-contact oil-retaining sheets 35,35A,35B and the three contact oil-retaining sheets 36,36A,37 one over the other such that the non-contact oil-retaining sheet 35 and the second contact oil-retaining sheet 47 are arranged in the top part of the case 12 and the bottom part of the case 12, respectively, lubricating oil is prevented from flowing out toward the upper surface of the lid 13 or the outer side walls of the case 12. Described specifically, when the ascending/descending unit 4 descends, the tongue portions 56,56A located at the top in the recess 17 of the oil-retaining member 14 are not strongly squeezed between the edge of the recess 16 in the lid 13 and the corresponding side walls 3A-1,3A-2 of the guide portion 3A although the tongue portions 56,56A are caused to swing upwardly. Moreover, when the ascending/descending unit 4 ascends, the tongue portions 56,56A located at the bottom in the recess 17 of the oil-retaining member 14 are not strongly squeezed between the edge of the recess 15 in the case 12 and the corresponding side walls 3A-1,3A-2 of the guide portion 3A although the tongue portions 56,56A are caused to swing downwardly. Lubricating oil therefore does not flow out excessively from the tongue portions 56,56A.

Since the first anti-wear meshes 50,51 and the second anti-wear meshes 52 are made of the same material and have the same dimensions, it is possible to sew the second anti-wear mesh 52 on the side edges 46A,46B of the recess 46 in each of the contact oil-retaining sheets 36,36A,37 or to sew the first anti-wear meshes 50,51 on the end edge 46C of the recess 46 in each of the contact oil-retaining sheets 36,36A,37. This makes it possible to avoid errors upon fabrication of the oil-retaining member 14. Moreover, only one type of parts are needed as the first anti-wear meshes 50,51 and the second anti-wear meshes 52. This facilitates management of parts at a fabrication site and brings about excellent productivity.

Figure 17:
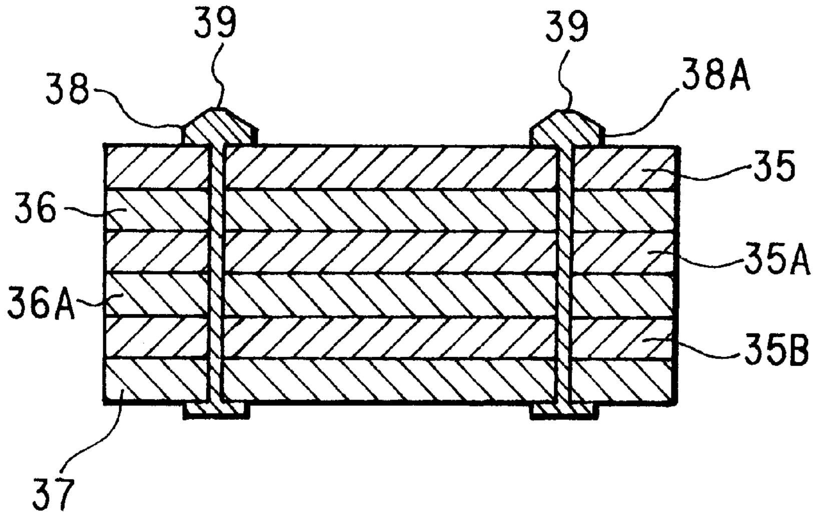
FIG. 17 also shows the same embodiment of the present invention, and is a schematic view of the oil-retaining member in a state not impregnated with lubricating oil.
Figure 18:
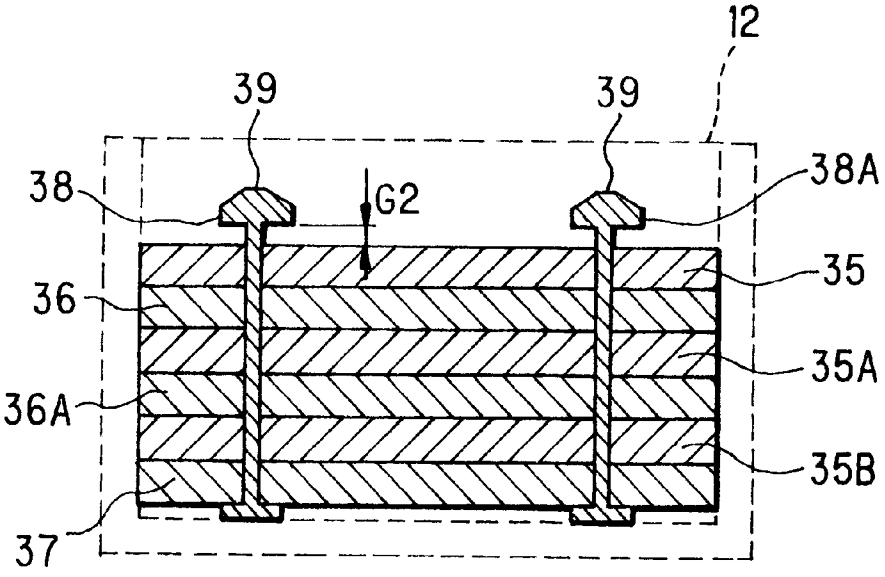
FIG. 18 also shows the same embodiment of the present invention, and is a schematic view of the oil-retaining member in a state impregnated with lubricating oil.

In a state that the oil-retaining member 14 has not been impregnated with lubricating oil, the oil-retaining member 14 is fully expanded between the upper end stoppers 38-2 and the rod-shaped lower end stoppers of the fastening members 38,38A,38B,38C as illustrated in FIG. 17. In a state that the oil-retaining member 14 has been fully impregnated with lubricating oil, on the other hand, the oil-retaining member 14 is shrunk in the stacked direction so that the spacing G2 is formed between the finger grip members 39 and the upper surface of the oil-retaining member 14, as is illustrated in FIG. 18. This makes it possible to minimize the inconvenience that upon pulling the oil-retaining member 14 out of the case 12, the hand of a worker may be fouled with lubricating oil even when the oil-retaining member 14 is lifted upwards at the finger grip member 39.

As the case 12 is made of synthetic resin, the recess 15 in the case 12 is prone to deformation when external force is applied to the case. When the top opening 12B of the case 12 is closed by the lid 13, the deformation preventing ribs 27 are brought into contact with the inner edge of the top opening 12B of the case 12 to prevent deformation of the recess 15 in the case 12. Although the lid 13 is made of synthetic resin, it is not readily deformed owing to the upright flange 28 and the deformation preventing ribs 27 on the outer peripheral end of the lid 13.

According to this embodiment, the case 12 and the lid 13 can be commonly used for two types of guide rails, a 13K guide rails and an 8K guide rail provided that the oil-retaining member 14 for the 13K guide rail is replaced by an oil-retaining member for the 8K guide rail.

Figure 19:
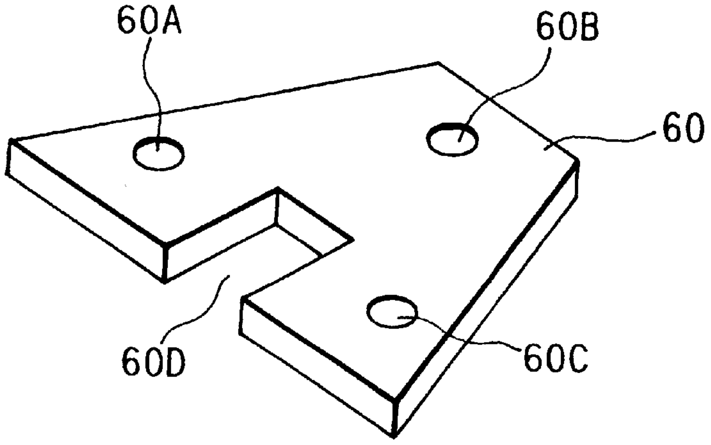
FIG. 19 also shows the same embodiment of the present invention, and is a perspective view of a wiping sheet.
Figure 20:
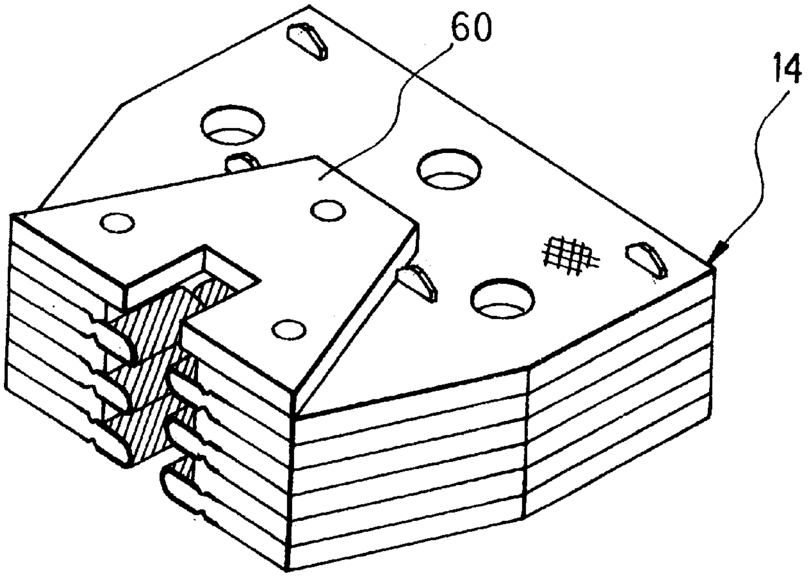
FIG. 20 also shows the same embodiment of the present invention, and is a perspective view of the oil-retaining member with the wiping sheet attached thereto.

In the above-described embodiment, the oil-retaining member 14 is formed in a construction that a wiping sheet 60 may be detachably arranged on at least one of the upper and lower surfaces of the oil-retaining member 14 such that the wiping sheet 60 can be maintained in contact with the guide portion 3A to clean the side edges 3A-1,3A-2 and end edge 3A-3 of the guide portion 3A. FIG. 19 illustrates the external profile of the wiping sheet 60. FIG. 20 shows the oil-retaining member 14 with the wiping sheet 60 attached to the upper surface of the oil-retaining member 14. At the site of a newly arranged elevator, the oil-retaining member 14 with the wiping sheet 60 attached as shown in FIG. 20 is arranged within the case 12, and dust and the like stuck on the side walls 3A-1,3A-2 and end wall 3A-3 of the guide portion 3A of the guide rail are removed by the wiping sheet 60. The wiping sheet 60 is then detached from the oil-retaining member 14, and the oil-retaining member 14 is brought into sliding contact only at the tongue portions 56,56A and second anti-wear meshes 52 thereof with the side walls 3A-1,3A-2 and end wall 3A-3 of the guide portion 3A. This makes it possible to avoid prematured fill-up of the tongue portions 56,56A and the second anti-wear meshes 52 with dust and the like, so that the oil feeding performance and wiping performance of the oil-retaining member 14 for the side walls 3A-1,3A-2 and end wall 3A3 of the guide portion 3A can be maintained well over an extended time. As the pins 18,18A,18B of the case 12 are fittedly inserted in the through-holes 60A,60B,60C of the wiping sheet 60, the attached position of the wiping sheet 60 relative to the oil-retaining member 14 remains unchanged. A recess 60D in the wiping sheet 60 is dimensioned such that the side walls 3A-1,3A-2 and end wall 3A-3 of the guide portion 3A can be maintained in direct contact with the edge of the recess 60D.

Figure 21:
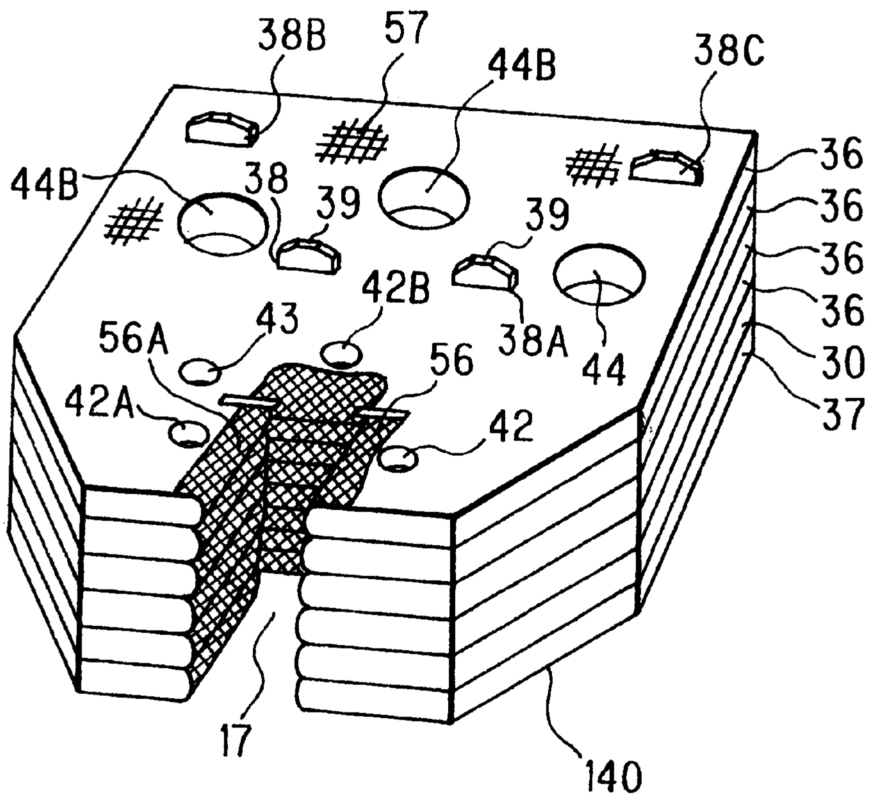
FIG. 21 shows another embodiment of the present invention, and is a perspective view of another oil-retaining member.

In the above-described embodiment, the oil-retaining member 1 was formed by alternately stacking the non-contact oil-retaining sheets 35,35A,35B and the contact oil-retaining sheets 36,36A,37 one over the other. Where an overflow of lubricating oil toward the side walls 3A-1,3A-2 and end wall 3A-3 of the guide portion 3A is permitted, six contact oil-retaining sheets alone may be stacked one over the other as in the case of an oil-retaining member 140 shown in FIG. 21. In FIG. 21, those reference signs which also appear in FIG. 8 indicate like elements.

This application claims the priorities of Japanese Patent Applications No. HEI 10-178878 filed Jun. 25, 1998, No. HEI 10-191959 filed Jul. 7, 1998 and No. HEI 11-51563 filed Feb. 26, 1999, all of which are incorporated herein by reference.

What is claimed is:

1. A guide rail lubricating device for an elevator, said device being provided at least with:

a bottomed case for being mounted on an ascending/descending unit operably ascendable and descendable within a shaft, said bottomed case having a recess through which a guide portion of a guide rail is extendible, an oil-retaining member accommodated within said case, and composed of plural oil-retaining sheets having oil absorbing property and oil retaining property, stacked one over the other and having recesses formed in at least one sides thereof to allow said guide portion to extend therethrough, and a lid having a recess, through which said guide portion is extendible, and generally covering a top opening of said case, whereby lubricating oil with which said oil-retaining sheets are impregnated is supplied to said guide portion from said recesses of said oil-retaining sheets, wherein:

side edges and an end edge of said recess in each of said oil-retaining sheets are separated from each other;

said side edges are formed in tongue portions covered by first wear-resistant meshes, which serve to prevent loosing of said side edges, such that said tongue portions can be maintained in sliding contact with side walls of said guide portion;

said end edge of said recess in said oil-retaining sheet is covered by a second wear-resistant mesh, which serves to prevent loosing of said end edge, such that said second wear-resistant mesh can be maintained in sliding contact with an end wall of said guide portion; and gaps are formed between said side edges and said end edge, respectively, such that said tongue portions and said second wear-resistant mesh can be maintained out of contact with each other.

2. The device of claim 1, wherein slits are formed extending alongside extensions of said end edge of said recess in each of said oil-retaining sheets to separate said end edge of said recess in said oil-retaining sheet and said side edges of said recess in said oil-retaining sheet from each other, and a width of said slits is set greater than a thickness of said second wear-resistant mesh to form said gaps.

3. The device of claim 1, wherein said first wear-resistant meshes are sewn on base portions of said tongue portions, respectively, such that said base portions are sunken on opposite sides thereof.

4. The device of claim 1, wherein said first wear-resistant meshes and said second wear-resistant meshes are made of the same material and have the same dimensions.

5. The device of claim, 1, wherein a dimension of a spacing between said tongue portions formed at said opposite side edges of said recess in each of said oil-retaining sheets is smaller than the dimension of a thickness of said guide portion.

6. The device of claim 1, wherein said recesses of said contact oil-retaining sheets are dimensioned such that pressing force of said first wear-resistant meshes against the corresponding side walls of said guide portion becomes greater than pressing force of said second wear-resistant mesh against said end wall of said guide portion.

7. The device of claim 1, wherein at least one fastening member is arranged fastening said plural oil-retaining sheets together; and an end portion of said fastening member extends out beyond an upper side of one of said plural oil-retaining sheets, said one oil-retaining sheet being located in a top part within said case, and is formed in a finger grip member for being used to lift said plural oil-retaining sheets.

8. A guide rail lubricating device for an elevator, said device being provided at least with:

a bottomed case for being mounted on an ascending/descending unit operably ascendable and descendable within a shaft, said bottomed case having a recess through which a guide portion of a guide rail is extendible, an oil-retaining member accommodated within said case, and composed of plural oil-retaining sheets having oil absorbing property and oil retaining property, stacked one over the other and having recesses formed in at least one sides thereof to allow said guide portion to extend therethrough, and a lid having a recess, through which said guide portion is extendible, and generally covering a top opening of said case, whereby lubricating oil with which said oil-retaining sheets are impregnated is supplied to said guide portion from said recesses of said oil-retaining sheets, wherein:

side edges and an end edge of said recess in each of said oil-retaining sheets are separated from each other;

said side edges are formed in tongue portions covered by first wear-resistant meshes, which serve to prevent loosing of said side edges, such that said tongue portions can be maintained in sliding contact with side walls of said guide portion;

said end edge of said recess in said oil-retaining sheet is covered by a second wear-resistant mesh, which serves to prevent loosing of said end edge, such that said second wear-resistant mesh can be maintained in sliding contact with an end wall of said guide portion; and said first wear-resistant meshes and said second wear-resistant mesh are made of nylon fibers having a 140-denier diameter and are formed in knitted structures of approximately 1 mm in thickness.

9. The device of claim 8, wherein slits are formed extending alongside said end edge of said recess in each of said oil-retaining sheets and extensions of said end edge on opposite sides of said end edge to separate said end edge of said recess in said oil-retaining sheet and said side edges of said recess in said oil-retaining sheet from each other, a width of said slits is set at approximately 2 mm, and a thickness of said second wear-resistant mesh is set at approximately 1 mm.

10. A guide rail lubricating device for an elevator, said device being provided at least with:

a bottomed case for being mounted on an ascending/descending unit operably ascendable and descendable within a shaft, said bottomed case having a recess through which a guide portion of a guide rail is extendible, an oil-retaining member accommodated within said case, and composed of plural oil-retaining sheets having oil absorbing property and oil retaining property, stacked one over the other and having recesses formed in at least one sides thereof to allow said guide portion to extend therethrough, and a lid having a recess, through which said guide portion is extendible, and generally covering a top opening of said case, whereby lubricating oil with which said oil-retaining sheets are impregnated is supplied to said guide portion from said recesses of said oil-retaining sheets, wherein:

said plural oil-retaining sheets comprise:

contact oil-retaining sheets, in which:

recesses, through which said guide portion extends, are formed with dimensions set smaller than contour dimensions of said guide portion, side edges and an end edge of said recess in each of said contact oil-retaining sheets are separated from each other, said side edges are formed in tongue portions covered by first wear-resistant meshes, which serve to prevent loosing of said side edges, such that said tongue portions can be maintained in sliding contact with side walls of said guide portion, and said end edge of said recess is covered by a second wear-resistant mesh, which serves to prevent loosing of said end edge, such that said second wear-resistant mesh can be maintained in sliding contact with an end wall of said guide portion, and non-contact oil-retaining sheets, in which:

recesses, through which said guide portion extends, are formed with dimensions set greater than contour dimensions of said guide portion such that side edges and an end edge of each of said recesses can be maintained out of contact with said guide portion;

said contact oil-retaining sheets and said non-contact oil-retaining sheets are alternately stacked one over the other into said oil-retaining member; and each of said contact oil-retaining sheets has gaps formed between said tongue portions thereof and said second wear-resistant mesh associated therewith, respectively, such that said tongue portions and said second wear-resistant mesh can be maintained out of contact with each other.

11. The device of claim 10, wherein in each of said contact oil-retaining sheets, slits are formed extending alongside extensions of said end edge on opposite sides of said end edge to separate said end edge and said side edges from each other, a width of said slits is set at approximately 2 mm, and a thickness of said second wear-resistant mesh is set at approximately 1 mm.

12. The device of claim 10, wherein said oil-retaining member is formed of three non-contact oil-retaining sheets as defined in claim 10 and three contact oil-retaining sheets as defined in claim 10, which are alternately stacked one over the other such that one of said non-contact oil-retaining sheets is arranged in a top part within said case and one of said contact oil-retaining sheets is arranged in a bottom part within said case.

13. The device of claim 10, wherein in each of said contact oil-retaining sheets, said first wear-resistant meshes are sewn on base portions of said tongue portions, respectively, such that said base portions are sunken on opposite sides thereof and sewn portions of said first wear-resistant meshes extend substantially along and in parallel with the corresponding side edges of said recess in adjacent one of said non-contact oil-retaining sheets.

14. The device of claim 10, wherein each of said non-contact oil-retaining sheets and said contact oil-retaining sheets has a main body made of kapok in the form of a sheet and is provided with a mesh covering said main body at both entire upper and lower sides thereof.

15. The device of claim 10, wherein said case is constructed in a volume such that, in a state that said oil-retaining member accommodated within said case is fully impregnated with lubricating oil, an oil-holding space is formed between an upper side of said oil-retaining member and a horizontal plane in which an upper edge of said case lies.

16. The device of claim 10, wherein said case is provided on an outer bottom thereof with a surrounding rib, which is formed on and along an entire outer peripheral end edge of said outer bottom, and also with at least one reinforcing rib formed within said surrounding rib such that fastening members for use in mounting said case on said ascending/descending unit can be held within a space formed by said surrounding rib and said reinforcing rib until said case is mounted on said ascending/descending unit.

17. The device of claim 10, wherein said case is provided at an upper end thereof with a horizontal flange along an entire periphery of said upper end; and said horizontal flange is provided with a lock element for maintaining said top opening of said case closed by said lid and also with a hinge portion for said lid.

18. The device of claim 10, wherein said lid is provided with a deformation preventing rib which can be maintained in contact with an inner edge of said top opening of said case while said top opening of said case is closed by said lid.

19. The device of claim 10, wherein said oil-retaining member is provided on at least one of upper and lower surfaces thereof with a wiping sheet which can be maintained in contact with the guide portion to perform cleaning of said side walls and said end wall of said guide portion.

20. The device of claim 10, wherein each of said non-contact oil-retaining sheets is provided on outer sides of said end edge and said side edges of said recess with positioning through-holes into which pins extending upwards from an inner bottom of said case can be inserted; and each of said contact oil-retaining sheets is provided on outer sides of said first wear-resistant meshes and said second wear-resistant mesh with positioning through-holes into which said pins extending upwards from said inner bottom of said case can be inserted.

21. The device of claim 10, wherein said lid is provided on an upper surface thereof at a location adjacent a peripheral edge of said recess with a center positioning indicator for facilitating alignment of a widthwise center position of a recess of said oil-retaining member, which is accommodated within said case, with a widthwise center position of said guide portion.

22. The device of claim 10, wherein said lid is provided on an upper surface thereof at a location adjacent a peripheral edge of said recess with an insertion positioning indicator for facilitating positioning of said end wall of said guide portion upon insertion of said guide portion into a recess of said oil-retaining member accommodated within said case.

23. A guide rail lubricating device for an elevator, said device being provided at least with:

a bottomed case for being mounted on an ascending/descending unit operably ascendable and descendable within a shaft, said bottomed case having a recess through which a guide portion of a guide rail is extendible, an oil-retaining member accommodated within said case, and composed of plural oil-retaining sheets having oil absorbing property and oil retaining property, stacked one over the other and having recesses formed in at least one sides thereof to allow said guide portion to extend therethrough, and a lid having a recess, through which said guide portion is extendible, and generally covering a top opening of said case, whereby lubricating oil with which said oil-retaining sheets are impregnated is supplied to said guide portion from said recesses of said oil-retaining sheets, wherein:

oiling holes are formed through all of said oil-retaining sheets other than one located in a bottom part within said case, respectively, such that an oilway is formed communicating from an upper side of one of said oil-retaining sheets, said one oil-retaining sheet being located in a top part within said case, to an upper side of said oil-retaining sheet located in said bottom part within said case; and said oil-retaining sheets are provided with inverted-setting preventing pin insertion bores, respectively, such that an inverted-setting preventing pin arranged within said case can be inserted into said inverted-setting preventing pin insertion bores only when said oil-retaining member is arranged within said case with said oil-retaining sheet, which is free of said oiling hole and is to be located in said bottom part within said case, being directed downward.

24. A case for a guide rail lubricating device for an elevator, comprising:

plural pins arranged on an inner bottom of said case to position an oil-retaining member;

an inverted-setting preventing pin arranged on said inner bottom to prevent inverted setting of said oil-retaining member;

a surrounding rib and at least one reinforcing rib, both of which are arranged on an outer bottom of said case;

a horizontal flange arranged on and along an upper end of said case and defining at an inner peripheral edge a top opening of said case;

a lid provided with a deformation preventing rib which can be maintained in contact with said inner peripheral edge of said horizontal flange;

a hinge portion arranged on said horizontal flange and connecting said lid and said case together such that said lid can be opened or closed as desired; and a resilient lock element arranged on said horizontal flange for maintaining said lid in a closed position;

wherein said pins, said inverted-setting preventing pin, said surrounding rib, said reinforcing rib, said horizontal flange, said lid, said hinge portion and said resilient lock element are integrally formed with a synthetic resin.

25. An oil-retaining member for a guide rail lubricating device for an elevator, comprising:

contact oil-retaining sheets, in which:

recesses, through which a guide portion extends, are formed with dimensions set smaller than contour dimensions of said guide portion, side edges and an end edge of said recess in each of said contact oil-retaining sheets are separated from each other, said side edges are formed in tongue portions covered by first wear-resistant meshes, which serve to prevent loosing of said side edges, such that said tongue portions can be maintained in sliding contact with side walls of said guide portion, and said end edge of said recess is covered by a second wear-resistant mesh, which serves to prevent loosing of said end edge, such that said second wear-resistant mesh can be maintained in sliding contact with an end wall of said guide portion, and non-contact oil-retaining sheets, in which:

recesses, through which said guide portion extends, are formed with dimensions set greater than contour dimensions of said guide portion such that side edges and an end edge of each of said recesses can be maintained out of contact with said guide portion;

wherein said contact oil-retaining sheets and said non-contact oil-retaining sheets are alternately stacked one over the other such that one of said non-contact oil-retaining sheets is arranged in a top part within said case and one of said contact oil-retaining sheets is arranged in a bottom part within said case;

all of said contact oil-retaining sheets and said non-contact oil-retaining sheets are fastened together by plural fastening members;

said non-contact oil-retaining sheets and said contact oil-retaining sheets are provided with positioning through-holes, respectively, at locations adjacent said recesses through which said guide portion can extend, and said non-contact oil-retaining sheets and said contact oil-retaining sheets other than one located in a bottom part within said case, are all provided with oiling holes, respectively, such that oilways are formed communicating from an upper side of one of said non-contact oil-retaining sheets, said one non-contact oil-retaining sheet being located in a top part within said case, to an upper side of said contact oil-retaining sheet located in said bottom part within said case;

said non-contact oil-retaining sheets and said contact oil-retaining sheets are all provided with inverted-setting preventing pin insertion bores, respectively, such that an inverted-setting preventing pin arranged within said case can be inserted into said inverted-setting preventing pin insertion bores only when said tightened non-contact oil-retaining sheets and contact oil-retaining sheets are placed in a right direction in said case; and each of said non-contact oil-retaining sheets and said contact oil-retaining sheets has a main body made of kapok in the form of a sheet and is provided with a mesh covering said main body at both entire upper and lower sides thereof.

* * * * *